US012130153B2

(12) United States Patent
Mayster et al.

(10) Patent No.: US 12,130,153 B2
(45) Date of Patent: Oct. 29, 2024

(54) GENERATION OF SURFACE MAPS TO IMPROVE NAVIGATION

(71) Applicants: Google LLC, Mountain View, CA (US); Yan Mayster, Aurora, CO (US); Brian Shucker, Superior, CO (US)

(72) Inventors: Yan Mayster, Aurora, CO (US); Brian Shucker, Superior, CO (US)

(73) Assignee: GOOGLE LLC, Mountain View, CA (US)

(*) Notice: Subject to any disclaimer, the term of this patent is extended or adjusted under 35 U.S.C. 154(b) by 310 days.

(21) Appl. No.: 17/606,296

(22) PCT Filed: Apr. 23, 2019

(86) PCT No.: PCT/US2019/028734
§ 371 (c)(1),
(2) Date: Oct. 25, 2021

(87) PCT Pub. No.: WO2020/219028
PCT Pub. Date: Oct. 29, 2020

(65) Prior Publication Data
US 2022/0205809 A1 Jun. 30, 2022

(51) Int. Cl.
*G01C 21/00* (2006.01)
*B60W 40/06* (2012.01)
(Continued)

(52) U.S. Cl.
CPC ......... *G01C 21/3807* (2020.08); *B60W 40/06* (2013.01); *B60W 40/076* (2013.01);
(Continued)

(58) Field of Classification Search
CPC .. G01C 21/3807; G06V 10/80; G06V 20/588; B60W 40/06; B60W 40/076; G01S 7/4802
See application file for complete search history.

(56) References Cited

U.S. PATENT DOCUMENTS 6,028,948 A * 2/2000 Kil .................. E01C 23/01
382/259
9,248,832 B2 2/2016 Huberman
(Continued)

FOREIGN PATENT DOCUMENTS

CN 202686359 1/2013
CN 106184346 12/2016
(Continued)

OTHER PUBLICATIONS

International Search Report for Application No. US2019/028734, mailed on Mar. 2, 2020, 5 pages.
(Continued)

Primary Examiner — Peter D Nolan
Assistant Examiner — Mikko Okechukwu Obioha
(74) Attorney, Agent, or Firm — DORITY & MANNING P.A.

(57) ABSTRACT

Provided are methods, systems, devices, and tangible non-transitory computer readable media for mapping geographical surfaces. The disclosed technology can access image data and sensor data. The image data can include a plurality of images of one or more locations and semantic information associated with the one or more locations. The sensor data can include sensor information associated with detection of one or more surfaces at the one or more locations by one or more sensors. One or more irregular surfaces can be detected based at least in part on the image data and the sensor data. The one or more irregular surfaces can include the one or more surfaces associated with the image data and the sensor data that satisfies one or more irregular surface criteria at each of the one or more locations respectively. Map data including information associated with the one or more irregular surfaces can be generated.

20 Claims, 10 Drawing Sheets

(51) Int. Cl.
  *B60W 40/076* (2012.01)
  *B60W 50/14* (2020.01)
  *G01S 7/48* (2006.01)
  *G06V 10/80* (2022.01)
  *G06V 20/56* (2022.01)
(52) U.S. Cl.
  CPC ............ *G01S 7/4802* (2013.01); *G06V 10/80* (2022.01); *G06V 20/588* (2022.01); *B60W 50/14* (2013.01); *B60W 2420/403* (2013.01); *B60W 2420/408* (2024.01); *B60W 2510/222* (2013.01); *B60W 2530/201* (2020.02); *B60W 2552/15* (2020.02); *B60W 2552/35* (2020.02); *B60W 2552/45* (2020.02); *B60W 2555/20* (2020.02); *B60W 2556/40* (2020.02); *B60W 2710/18* (2013.01); *B60W 2710/20* (2013.01)

(56) References Cited

U.S. PATENT DOCUMENTS

| | | | |
|---|---|---|---|
| 9,944,317 | B2 | 4/2018 | Lee |
| 10,160,447 | B2 * | 12/2018 | Lavoie .................. B60W 50/00 |
| 10,416,676 | B2 | 9/2019 | Naka et al. |
| 10,922,578 | B2 | 2/2021 | Banerjee et al. |
| 11,498,537 | B1 * | 11/2022 | Gaudin ................. B60T 8/1725 |
| 11,526,711 | B1 * | 12/2022 | Cardona .............. G06V 20/584 |
| 2013/0169794 | A1 * | 7/2013 | Shimomura ............ E01C 23/01 |
| | | | 348/128 |
| 2013/0314503 | A1 * | 11/2013 | Nix ........................ G06V 20/58 |
| | | | 348/46 |
| 2014/0347448 | A1 | 11/2014 | Hegemann et al. |
| 2015/0012165 | A1 * | 1/2015 | Israelsson ............ G05D 1/0214 |
| | | | 701/23 |
| 2015/0224925 | A1 * | 8/2015 | Hartmann .............. G06V 20/56 |
| | | | 348/148 |
| 2015/0241878 | A1 * | 8/2015 | Crombez ........ B60W 60/00184 |
| | | | 701/23 |
| 2016/0042644 | A1 * | 2/2016 | Velusamy ........ G08G 1/096775 |
| | | | 340/435 |
| 2017/0247040 | A1 * | 8/2017 | Miller .................. G05D 1/0248 |
| 2018/0004211 | A1 * | 1/2018 | Grimm ................ G05D 1/0066 |
| 2018/0194286 | A1 * | 7/2018 | Stein .................... B60G 17/0165 |
| 2018/0335774 | A1 * | 11/2018 | Sato .................... B60W 50/0098 |
| 2020/0209864 | A1 * | 7/2020 | Chen .................. G01C 21/3811 |
| 2022/0281456 | A1 * | 9/2022 | Giovanardi ........... G01S 17/931 |

FOREIGN PATENT DOCUMENTS

| | | |
|---|---|---|
| CN | 108627135 | 10/2018 |
| JP | 2011242293 | 12/2011 |

OTHER PUBLICATIONS

Chinese Search Report Corresponding to Application No. 2019800975873 on Mar. 26, 2024.
Extended European Search Report for Application No. EP 24165374.0, mailed Jul. 26, 2024, 14 pages.

* cited by examiner

GENERATION OF SURFACE MAPS TO IMPROVE NAVIGATION

PRIORITY CLAIM

This application is based upon and claims the right of priority under 35 U.S.C. § 371 to International Application No. PCT/US2019/028734 filed on Apr. 23, 2019. Applicant claims priority to and the benefit of each of such applications and incorporates all such applications herein by reference in their entirety.

FIELD

The present disclosure relates generally to a system for generating maps of surfaces using sensors and semantic information, and in particular to identifying irregular surfaces in geographic regions.

BACKGROUND

Operations associated with mapping information can be implemented on a variety of computing devices. These operations can include processing the mapping information for access and use by a user or computing system. Further, the operations can include sending and receiving data to remote computing systems. However, the types of operations and the way in which the operations are performed can change over time, as can the underlying hardware that implements the operations. Accordingly, there are different ways to leverage computing resources associated with mapping information.

SUMMARY

Aspects and advantages of embodiments of the present disclosure will be set forth in part in the following description, or may be learned from the description, or may be learned through practice of the embodiments.

One example aspect of the present disclosure is directed to a method of mapping. The method can include accessing, by a computing system comprising one or more processors, image data and sensor data. The image data can include a plurality of images of one or more locations and semantic information associated with the one or more locations. The sensor data can include sensor information associated with detection of one or more surfaces at the one or more locations by one or more sensors. The method can include determining, by the computing system, one or more irregular surfaces based at least in part on the image data and the sensor data. The one or more irregular surfaces can include the one or more surfaces associated with the image data and the sensor data that satisfy one or more irregular surface criteria at each of the one or more locations respectively. Furthermore, the method can include generating, by the computing system, map data including information associated with the one or more irregular surfaces.

Another example aspect of the present disclosure is directed to one or more tangible non-transitory computer-readable media storing computer-readable instructions that when executed by one or more processors cause the one or more processors to perform operations. The operations can include accessing image data and sensor data. The image data can include semantic information that is descriptive of a geographic region. The sensor data can be indicative of one or more surface elements associated with one or more surfaces in the geographic region. The operations can include determining whether there is an association between the one or more surface elements and the semantic information that is descriptive of the geographic region. Furthermore, the operations can include generating map data for the geographic region associated with the one or more surface elements based on whether there is the association between the one or more surface elements and the semantic information that is descriptive of the one or more geographic features.

Another example aspect of the present disclosure is directed to a computing system that can include: one or more processors; and one or more tangible non-transitory computer-readable media storing instructions that when executed by the one or more processors cause the one or more processors to perform operations. The operations can include accessing image data and sensor data. The image data can include semantic information that is descriptive of a geographic region. The sensor data can be indicative of one or more surface elements associated with one or more surfaces in the geographic region. The operations can include determining whether there is an association between the one or more surface elements and the semantic information that is descriptive of the geographic region. Furthermore, the operations can include generating map data for the geographic region associated with the one or more surface elements based on whether there is the association between the one or more surface elements and the semantic information that is descriptive of the one or more geographic features.

Other example aspects of the present disclosure are directed to other methods, systems, devices, apparatuses, or tangible non-transitory computer-readable media for mapping.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
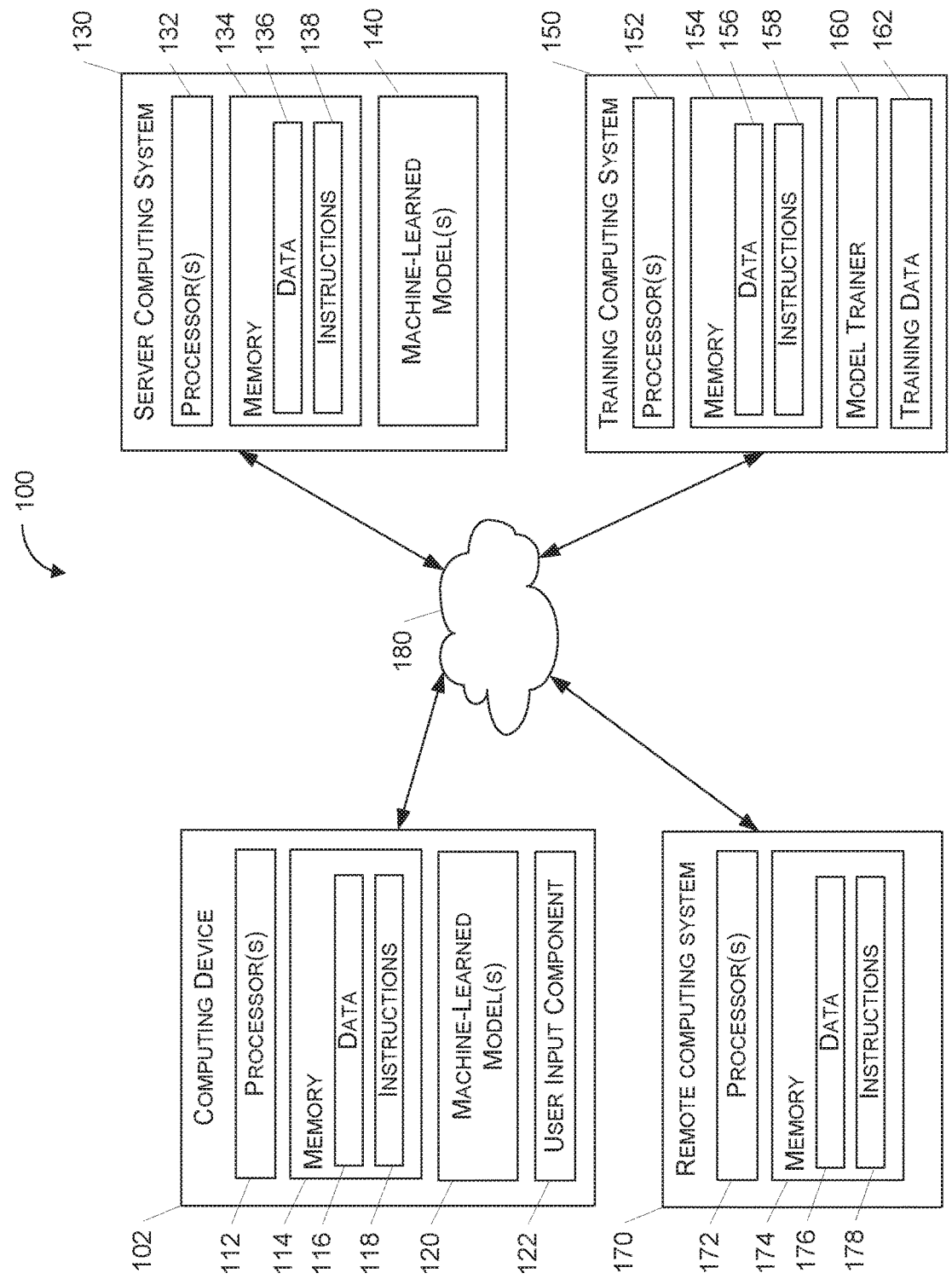
FIG. 1 depicts an overview including an example of a system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improving navigation and mapping by determining the state of surfaces based on image data and sensor data, for example by determining the location of irregular surfaces. The determination of irregular surfaces may be used to improve the control of a vehicle system of a vehicle, such as a motor system, a steering system, a braking system, a lighting system, or a navigation system. In particular, the disclosed technology can include a computing system arranged to receive image data and sensor data. The image data can include images of locations and semantic information that is descriptive of features associated with each respective location. For example, the image data can be based on images of locations that have been processed using image content analysis or other techniques to extract semantic information from the images. The sensor data can include sensor information associated with detection of surfaces in the locations by sensors, for example one or more vehicle-mounted sensors. For example, the sensor data can include light detection and ranging (LiDAR) point cloud data that provides a three-dimensional representation of a location including the surfaces of the location. Further, the computing system can determine irregular surfaces at the locations based on determining the surfaces satisfy surface irregularity criteria. By way of example, satisfying the surface irregularity criteria can include the depth of a depression in a surface being greater than a threshold depth. Furthermore, the computing system can determine whether there is some association between the image data and the sensor data. As such, the computing system can determine whether there is agreement between the states of surfaces indicated by the image data and the sensor data. The computing system can also generate map data that includes information associated with the locations of irregular surfaces determined by the computing system. For example, the computing system can generate map data that includes the geographic location of irregular surfaces as well as an indication of the type of surface, such as whether a ground surface is a pothole or a speedbump. The generated map data can be used to improve route planning, for example for vehicle navigation. The map data may be used to determine a navigational route for a vehicle, in which the generation of map data that includes information associated with the locations of irregular surfaces can allow for an optimized navigational route to be determined. Further, the computing system can control one or more vehicle systems of a vehicle based at least in part on the map data. For example, the one or more vehicle systems can include one or more motor systems, one or more steering systems, one or more braking systems, and/or one or more lighting systems. Thus aspects of the present disclosure may provide improved and more accurate control of a vehicle system, which may have beneficial safety implications.

In some embodiments, the map data can be used for various purposes including distinguishing intentionally irregular surfaces such as speed bumps from unintentionally irregular surfaces such as detritus on a ground surface. As such, the disclosed technology can more accurately determine the location of irregular surfaces, including intentionally irregular surfaces and unintentionally irregular surfaces, through use of a combination of semantic information and sensor data. Further, the disclosed technology can provide the benefits of more effective maps with more clearly demarcated irregular surfaces, improved road safety resulting from clear identification of irregular surfaces, improved utilization of road construction and repair resources resulting from early identification and location of irregular road surfaces, as well as improved passenger comfort and a reduction in wear and tear on vehicles resulting from the avoidance or more careful traversal of irregular surfaces.

In some embodiments, the disclosed technology can include a computing system that includes one or more computing devices, each of which include one or more computer processors and one or more storage devices including a memory that can store one or more instructions. The computing system can access, send, receive, process, generate, and/or modify data that can be encoded in the form of one or more information patterns or structures that can be stored in the one or more memory devices. Further, the data and/or one or more signals can be exchanged by the computing system with various other systems and/or devices including a plurality of service systems that can send and/or receive data including image data and sensor data associated with one or more states of one or more locations of an environment. The one or more states can, for example, include one or more states of surfaces. Furthermore, the computing system can include specialized hardware and/or software that enable the computing system to perform one or more operations specific to the disclosed technology. For example, the computing system can include one or more application specific integrated circuits that are configured to perform operations associated with determining the occurrence of surface irregularities in an environment.

The computing system can access image data and/or sensor data. The image data can include a plurality of images of one or more locations and/or semantic information associated with the one or more locations. Further, the semantic information can include information descriptive of one or more features associated with the one or more locations. For example, the image data can include one or more raster images that are associated with semantic information describing one or more features depicted in the one or more images, including buildings, roads, sidewalks, traffic lights, and/or road signs.

In some embodiments, the image data can include semantic information associated with one or more road signs including one or more speed bump signs, one or more barricade signs, and/or one or more construction signs. The semantic information associated with the one or more road signs can include one or more locations and one or more road sign types of the one or more road signs.

The sensor data can include sensor information associated with detection of one or more surfaces at the one or more locations by one or more sensors. For example, the one or more sensors can generate a plurality of sensor outputs associated with detection of one or more surfaces in the one or more locations. For example, the sensor data can include LiDAR point cloud data associated with ground surfaces, including roads, of each of the one or more locations.

In some embodiments, the one or more sensors can include one or more light detection and ranging (LiDAR) devices configured to generate sensor data based at least in part on a LiDAR scan of the one or more surfaces of the one or more locations. The one or more LiDAR devices may, for example, be mounted on a vehicle. Furthermore, the one or more sensors may include a plurality of LiDAR devices, each of which is mounted on a respective vehicle. Thus a network of vehicles may be used to provide accurate and/or frequently updated sensor data to the computing device.

In some embodiments, the image data can be based at least in part on image content analysis of one or more images. The image content analysis can be performed by a computing system that analyzes the semantic content of an image and generates semantic information including a description of the features found in the image. By way of example, the image content analysis can use one or more machine-learned models that have been configured and/or trained to detect and identify one or more features in an image. The image data can also be associated with corpus of street-level imagery that includes images captured from a street level perspective. Further, the system can utilize the image content analysis of street level imagery and/or other images including user-generated imagery and/or publicly accessible street-level imagery for the purpose of determining the locations of irregular surfaces and objects associated with irregular surfaces including signage indicating the proximity of an irregular surface. In one embodiment, the semantic information includes one or more geographic locations of one or more features in an image.

The computing system can determine one or more irregular surfaces of the one or more locations based at least in part on the image data and the sensor data. The one or more irregular surfaces can include the one or more surfaces that satisfy one or more irregular surface criteria. For example, the computing system can access the semantic information associated with the image data to determine when construction activity involving digging holes is occurring in an area. Satisfying the one or more irregular surface criteria can include determining that semantic information is indicative of an irregular surface. By way of further example, the computing system can access the LiDAR data associated with the sensor data to determine spatial characteristics of a location. Satisfying the one or more irregular surface criteria can include the sensor data indicating that certain spatial characteristics including depressions exceeding a depth threshold are detected in the surface at a location. In some embodiments, the one or more irregular surface criteria are satisfied when both the image data and the sensor data are indicative of an irregular surface. In some embodiments, the one or more irregular surface criteria are satisfied when the image data is indicative of one or more irregular surfaces and the sensor data does not contradict the existence of the one or more irregular surfaces as indicated by the image data; or the sensor data is indicative of one or more irregular surfaces and the image data does not contradict the existence of the one or more irregular surfaces as indicated by the sensor data.

In some embodiments, determining the one or more irregular surfaces based at least in part on the image data and the sensor data can include determining that the one or more irregular surface criteria are satisfied when the sensor data is indicative of one or more portions of the one or more surfaces that exceed a surface area threshold and include a protuberance that exceeds a surface area threshold and/or a depression that exceeds a depth threshold. For example, the computing system can use the sensor data to determine three-dimensional features of the one or more surfaces. By way of example, based on the three-dimensional features of the one or more surfaces, the computing system can determine that a portion of a surface that is larger than one hundred square centimeters and that has a depth of greater than three centimeters is an irregular surface and that a portion of a surface that is larger than one hundred square centimeters and that has a depth of one centimeter is not an irregular surface.

In some embodiments, the height threshold can be based at least in part on a height above an average height of a surface of the one or more surfaces. Further, the depth threshold can be based at least in part on a depth below an average height of the surface of the one or more surfaces. Furthermore, in some embodiments, the height threshold can be based at least in part on a height of a protuberance with respect to the surface within a predetermined distance of the protuberance. Further, in some embodiments, the depth threshold can be based at least in part on a depth of a depression with respect to the surface within a predetermined distance of the depression. For example, the computing system can access the sensor data to determine that the height of a protuberance is five centimeters higher than a ground surface in a one meter radius around the protuberance.

In some embodiments, determining the one or more irregular surfaces based at least in part on the image data and the sensor data can include determining when one or more portions of the one or more surfaces have a shape that satisfies one or more irregular shape criteria associated with irregularity in a length of sides of the one or more surfaces and/or irregularity in angles of the one or more surfaces. For example, the computing system can access sensor data that can be used to determine spatial characteristics of one or more portions of a surface. The spatial characteristics of a regular portion of surface can include square sections of concrete blocks with evenly shaped corners. By way of contrast, the spatial characteristics of an irregular portion of surface can include jagged edges of unequal length.

In some embodiments, determining the one or more irregular surfaces based at least in part on the image data and the sensor data can include determining that the one or more irregular surface criteria are satisfied when the semantic information associated with a location of the one or more locations is descriptive of the sensor information associated with the detection of the one or more surfaces by the one or more sensors. For example, the computing system can access the semantic information associated with a location to determine when the semantic information includes a description of speed bumps at the location. Satisfying the one or more irregular surface criteria can include determining that the semantic information indicates that there are speed bumps at the location and that the sensor information detects a ground surface of the location that has spatial characteristics corresponding to a speed bump.

In some embodiments, determining the one or more irregular surfaces based at least in part on the image data and the sensor data can include determining one or more vehicle characteristics of a vehicle. For example, the computing system can determine a ground clearance of a vehicle associated with the computing system.

In some embodiments, the one or more vehicle characteristics can include a ground clearance of the vehicle, a height of a vehicle, a width of a vehicle, a distance between a front wheel of the vehicle and a front bumper of the vehicle, and/or a firmness of the vehicle's suspension system. Further, the one or more vehicle characteristics can include a mass or weight of a vehicle and/or one or more physical dimensions of the vehicle. For example, the ground clearance of the vehicle can include a distance between the lowest point of a vehicle's chassis, external body panel, or undercarriage and a flat surface below the vehicle's tires.

Further, the computing system can determine one or more gradients associated with each of the one or more surfaces. For example, the computing system can use the sensor data to determine the angle of a slope of a surface.

Further, the computing system can determine that the one or more irregular surface criteria are satisfied when the one or more gradients associated with each of the one or more surfaces exceed a gradient threshold. In some embodiments, the gradient threshold can be based at least in part on the one or more characteristics of the vehicle. For example, a vehicle with a relatively low ground clearance and a relatively low gradient threshold can less readily satisfy the one or more irregular surface criteria than a vehicle with a relatively high ground clearance and a relatively higher gradient threshold.

The computing system can generate map data that includes information associated with the one or more irregular surfaces. Further, the map data can include information associated with the one or more locations of the one or more irregular surfaces. For example, the computing system can access the image data and the sensor data to provide information including the geographic location of the one or more irregular surfaces as well as the depth or height of the one or more irregular surfaces.

In some embodiments, the map data can include a latitude associated with each of the one or more irregular surfaces, a longitude associated with each of the one or more irregular surfaces, an altitude associated with each of the one or more irregular surfaces, a height of each of the one or more irregular surfaces, a depth of each of the one or more irregular surfaces, and/or a surface area of each of the one or more irregular surfaces.

In some embodiments, the computing system can send the map data to a remote computing system associated with updating the image data or the sensor data. For example, the computing system can wirelessly send the map data to one or more remote computing devices associated with maintaining maps of one or more locations. Based on the map data, various actions including rescanning a location can be taken to address the mismatch between the image data and the sensor data.

The computing system can determine one or more surface types associated with each of the one or more surfaces. For example, the computing system can determine the one or more surface types based at least in part on semantic information associated with the image data, which can indicate whether a surface is paved or unpaved. By way of further example, the computing system can use the sensor data to determine one or more spatial characteristics of a surface that correspond to one or more surface types.

In some embodiments, the one or more surface types can include one or more ground surfaces or one or more non-ground surfaces. The one or more ground surfaces can include one or more paved ground surfaces, one or more unpaved ground surfaces, one or more sidewalk surfaces, and/or one or more gravel surfaces.

In some embodiments, the one or more non-ground surfaces can include one or more lateral surfaces and/or one or more overhead surfaces. The one or more lateral surfaces can include one or more walls, fences, and/or other surfaces that are vertically aligned. The one or more overhead surfaces can include one or more surfaces that are above some predetermined height threshold including the upper portions of gates, tunnel entrances, garage entrances, doorways, and/or overhead barriers.

In some embodiments, the image data can include semantic information associated with physical dimensions of an overhead surface including a height of an overhead surface. Further, the image data can include semantic information associated with the type and material properties of the overhead surface. For example, the semantic data can indicate that the overhead surface is a tunnel entrance made from brick.

Further, the computing system can generate map data that includes information associated with the one or more surface types of each of the one or more locations. For example, the map data can indicate the surface type of an area within a particular set of geographic coordinates.

The computing system can determine, based at least in part on the image data and the sensor data, one or more irregular surface types associated with each of the one or more irregular surfaces. For example, the computing system can determine the one or more irregular surface types based at least in part on semantic information associated with the image data, which can indicate when a ground surface include a speed bump. By way of further example, the computing system can use the sensor data to determine one or more spatial characteristics of a ground surface, where the spatial characteristics correspond to one or more surface types including speed bumps and/or potholes.

The computing system can determine that the one or more irregular surfaces are intentionally irregular surfaces when the one or more irregular surface types associated with the image data for an irregular surface of the one or more irregular surfaces match the one or more irregular surface types associated with the sensor data for the irregular surface.

In some embodiments, the computing system can determine that the one or more irregular surfaces are intentionally irregular surfaces when one or more signs are within a predetermined distance of the one or more irregular surfaces and the one or more signs are associated with one or more irregular surface types of the one or more irregular surfaces. For example, the computing system can use semantic information associated with the image data to determine the location of road signs in a particular location. Further, the computing system can determine that an irregular surface is an intentionally irregular surface when a road sign indicating "SPEED BUMP AHEAD" is within ten meters of an irregular surface that is determined to be a speed bump based on the sensor data.

In some embodiments, the computing system can determine that the one or more irregular surfaces that are not intentionally irregular surfaces are unintentionally irregular surfaces. An intentionally irregular surface can include a structure that is intentionally built at a particular location. A speed bump is an example of an intentionally irregular surface. An unintentionally irregular surface can include a surface feature that results from deterioration or damage to a surface and/or a structure that is not intentionally built at a particular location. A pothole is an example of an intentionally irregular surface.

In some embodiments, a computing system can generate a first notification in response to the one or more intentionally irregular surfaces or a second notification in response to the one or more unintentionally irregular surfaces. For example, the computing system can generate one or signals that cause a speaker to chime when an intentionally irregular surface is detected and a cautionary message ("BUMPY ROAD AHEAD") when an unintentionally irregular surface is detected.

The computing system can determine, based at least in part on the image data and the sensor data, a geographic region and/or weather conditions associated with each of the one or more locations. For example, the computing system can access image data that includes semantic information indicating that a location is in a particular nation or a particular region or territory of a nation. By way of further example, the computing system can access image data that is updated in real-time and which includes semantic information associated with real-time weather conditions at a location.

The computing system can adjust the one or more irregular surface criteria based at least in part on the geographic region and/or the weather conditions associated with each of the one or more locations. For example, the computing system can adjust a height threshold associated with one or more surface irregularities when the weather conditions include a large amount of snowfall.

The computing system can control one or more vehicle systems of a vehicle based at least in part on the map data. The one or more vehicle systems can include one or more motor systems, one or more steering systems, one or more braking systems, and/or one or more lighting systems. For example, the computing system can control the steering system of an autonomous vehicle to avoid a surface irregularity indicated in the map data. In some examples, map data generated by a computing system remote from a vehicle may be used by the vehicle to trigger or otherwise initiate actions at the vehicle.

The computing system can generate data associated with implementing one or more indications based at least in part on a vehicle being within a predetermined distance of the one or more irregular surfaces. The one or more indications can include one or more images of the one or more irregular surfaces, one or more maps that can include the one or more locations of the one or more irregular surfaces, one or more textual descriptions of the one or more irregular surfaces, and/or one or more auditory indications associated with the one or more irregular surfaces. For example, a vehicle computing system can generate one or more auditory indications including a chiming sound when an autonomous vehicle controlled by the computing system is within fifty meters of an irregular surface.

In some embodiments, the one or more irregular surface criteria can include an irregularity height threshold and/or an irregularity depth threshold. For example, the irregularity height threshold can include a height above the average height of a surface in a predetermined area.

The computing system can access vehicle height data associated with a ground clearance of a vehicle. For example, the ground clearance of the vehicle can be based at least in part on the minimum height above the surface of any portion of the vehicle, not including the vehicle's wheels, when the vehicle is stationary.

Further, the computing system can adjust the irregularity height threshold and/or the irregularity depth threshold based at least in part on the ground clearance of the vehicle. For example, for a first vehicle with a ground clearance of twenty centimeters, the irregularity depth threshold can be sixty percent of the ground clearance of the first vehicle, twelve centimeters. By way of further example, for a second vehicle with a higher ground clearance of fifty centimeters, the irregularity depth threshold can also be sixty percent of the ground clearance of the second vehicle, thirty centimeters.

In some embodiments, the computing system can access image data and sensor data including image data that can include semantic information that is descriptive of a geographic region; and/or sensor data that can be indicative of one or more surface elements associated with one or more surfaces in the geographic region.

Further, the computing system can determine whether there is an association between the one or more surface elements and the semantic information that is descriptive of the geographic region. For example, the computing system can evaluate the one or more surface elements and the semantic information to determine whether the one or more surface elements and the semantic information include information that is associated with one or more features of the geographic region. By way of example, the one or more features of the geographic region can include irregular surfaces.

By way of further example, the computing system can access the image data and the sensor data for a particular location at the geographic region and compare one or more spatial characteristics provided by the semantic information associated with one or more images of the location at the geographic region to one or more spatial characteristics of the one or more surface elements.

The computing system can generate data for the geographic region associated with the one or more surface elements. In some embodiments, the map data can be based at least in part on whether there is an association between the one or more surface elements and the semantic information that is descriptive of the one or more geographic features. In some examples, the semantic information may be associated with one or more geographic features such as a road sign and the one or more surface elements can be associated with a surface such as a road. In this manner, the geographic features can be physically separate from the surface elements. Accordingly, the systems as described can utilize semantic information of a first object in combination with sensor data of a second object (e.g., surface) to determine map information for a geographic region.

In some embodiments, the map data can include geographic information associated with one or more locations of the geographic region where the one or more surface elements are associated with the semantic information. For example, the computing system can determine that the one or more surface elements are associated with the semantic information based on the one or surface elements having a spatial arrangement consistent with a depression in a ground surface including a pothole and the semantic information including an indication that describes a pothole at the same location as the one or more surface elements.

The systems, methods, devices, apparatuses, and tangible non-transitory computer-readable media in the disclosed technology can provide a variety of technical effects and benefits including an improvement in the determination of the location and type of irregular surfaces including irregular ground surfaces. The disclosed technology may also provide benefits including improvements in the form of more effective and reliable maps, improved road safety, improved utilization of road construction and repair resources, improved passenger comfort, and a reduction in wear and tear on vehicles.

Furthermore, the disclosed technology can improve the effectiveness of maps by combining the rich semantic information included in images on which image content analysis has been performed with the high level of precision provided by sensors including LiDAR. By using semantic information in conjunction with sensor information, the location of irregular surfaces can be more accurately and reliably determined and those irregular surfaces can be categorized as intentionally irregular surfaces such as speed bumps or unintentionally irregular surfaces such as potholes that are the result of road deterioration. As such, maps can have more accurate labels to indicate and distinguish the occurrence of intentionally irregular surfaces and unintentionally irregular surfaces.

Additionally, the disclosed technology can improve the safety of roads by more effectively identifying and locating the occurrence of irregular surfaces. For example, by identifying unintentionally irregular surfaces before those surfaces have descended into a state that makes a road unsuitable for travel, the surfaces can be repaired and a high level of safety for vehicles travelling on the respective surfaces can be maintained.

Furthermore, the disclosed technology can allow for unintentionally irregular surfaces to be more rapidly identified and located so that actions to remediate the irregular surfaces can be performed before the surface is in a state that requires a disproportionately high expenditure of time and resources to repair. For example, earlier repair of an unintentionally irregular surface can save expense in comparison to the more expensive repairs that are required when an unintentionally irregular surface is in an advanced state of disrepair.

The use of the disclosed technology can also improve the comfort of passengers in a vehicle that can navigate around the irregular surfaces. For example, an autonomous vehicle can use the locations of the irregular surfaces to slow down or avoid an irregular surface without having to engage in sharp course corrections or braking that may result when an irregular surface is determined at the last moment.

Additionally, timelier repair of irregular surfaces due to more rapid identification of those irregular surfaces can result in a reduction in the wear and tear on a vehicle that results from navigation over the irregular surfaces. For example, driving over potholes can prematurely wear down the suspension system of a vehicle. Further, when a vehicle is apprised of an imminent speed bump, the vehicle can slow down and thereby reduce wear and tear resulting from traversing the speed bump at too high of a velocity.

Accordingly, the disclosed technology provides the specific benefits of more effective maps, improved road safety, improved utilization of road construction and repair resources, improved passenger comfort, and a reduction in wear and tear on vehicles, any of which can be used to improve the effectiveness of a wide variety of services including mapping services and/or navigation services.

With reference now to FIGS. 1-12, example embodiments of the present disclosure will be discussed in further detail. FIG. 1 depicts a diagram of an example system according to example embodiments of the present disclosure. The system 100 includes a computing device 102, a server computing system 130, a training computing system 150, and one or more remote computing systems 170 that are communicatively connected and/or coupled over a network 180.

The computing device 102 can include any type of computing device, including, for example, a personal computing device (e.g., laptop computing device or desktop computing device), a mobile computing device (e.g., smartphone or tablet), a gaming console, a controller, a wearable computing device (e.g., a smart watch), an embedded computing device, and/or any other type of computing device.

The computing device 102 includes one or more processors 112 and a memory 114. The one or more processors 112 can be any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform operations. In some embodiments, the data 116 can include image data that includes semantic information associated with one or more images and/or sensor data that includes sensor information associated with detection of one or more surfaces of the one or more locations.

In some embodiments, the computing device 102 can perform one or more operations including: accessing image data that includes semantic information associated with one or more images; and/or sensor data that includes sensor information associated with detection of one or more surfaces of the one or more locations. The computing device 102 can determine one or more irregular surfaces at one or more locations based at least in part on the image data and the sensor data that satisfy one or more irregular surface criteria at each of the one or more locations. Further, the computing device 102 can generate an output including map data that includes information associated with the one or more irregular surfaces.

In some embodiments, the computing device 102 can perform one or more operations including accessing image data that can include semantic information that is descriptive of a geographic region; and sensor data that can be indicative of one or more surface elements associated with one or more surfaces in the geographic region. Further, the computing device 102 can determine whether there is an association between the one or more surface elements and the semantic information that is descriptive of the geographic region; and generate map data for the geographic region associated with the one or more surface elements based on whether there is the association between the one or more surface elements and the semantic information that is descriptive of the one or more geographic features.

In some implementations, the computing device 102 can store or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Examples of the one or more machine-learned models 120 are discussed with reference to FIGS. 1-12.

In some implementations, the one or more machine-learned models 120 can be received from the server computing system 130 over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to perform parallel image recognition and semantic information processing across multiple instances of the machine-learned model 120). More particularly, the one or more machine-learned models 120 can access image data that includes semantic information associated with one or more images and/or sensor data that includes sensor information associated with detection of one or more surfaces of the one or more locations; and/or determine one or more irregular surfaces at one or more locations based at least in part on the image data and the sensor data that satisfy one or more irregular surface criteria at each of the one or more locations. Further, the one or more machine learned models 120 can generate an output including map data that includes information associated with the one or more irregular surfaces.

In some embodiments, the one or more machine-learned models 120 can perform one or more operations including accessing image data that can include semantic information that is descriptive of a geographic region; and sensor data that can be indicative of one or more surface elements associated with one or more surfaces in the geographic region. Further, the one or more machine-learned models 120 can determine whether there is an association between the one or more surface elements and the semantic information that is descriptive of the geographic region; and generate map data for the geographic region associated with the one or more surface elements based on whether there is the association between the one or more surface elements and the semantic information that is descriptive of the one or more geographic features.

Additionally or alternatively, one or more machine-learned models 140 can be included in or otherwise stored and implemented by the server computing system 130 that communicates with the computing device 102 according to a client-server relationship. For example, the machine-learned models 140 can be implemented by the server computing system 140 as a portion of a web service (e.g., an irregular surface determination service). Thus, one or more machine-learned models 120 can be stored and implemented at the computing device 102 and/or one or more machine-learned models 140 can be stored and implemented at the server computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger or a stylus). The touch-sensitive component can serve to implement a virtual keyboard. Other example user input components include a microphone, a mechanical keyboard, an electromechanical keyboard, and/or other means by which a user can provide user input.

The server computing system 130 includes one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the server computing system 130 to perform operations. In some embodiments, the data 136 can include image data that includes semantic information associated with one or more images and/or sensor data that includes sensor information associated with detection of one or more surfaces of the one or more locations.

In some embodiments, the server computing system 130 can perform one or more operations including accessing: image data that includes semantic information associated with one or more images; and/or sensor data that includes sensor information associated with detection of one or more surfaces of the one or more locations. The server computing system 130 can determine one or more irregular surfaces at one or more locations based at least in part on the image data and the sensor data that satisfy one or more irregular surface criteria at each of the one or more locations. Further, the server computing system 130 can generate an output including map data that includes information associated with the one or more irregular surfaces.

In some embodiments, the server computing system 130 can perform one or more operations including accessing image data that can include semantic information that is descriptive of a geographic region; and sensor data that can be indicative of one or more surface elements associated with one or more surfaces in the geographic region. Further, the server computing system 130 can determine whether there is an association between the one or more surface elements and the semantic information that is descriptive of the geographic region; and generate map data for the geographic region associated with the one or more surface elements based on whether there is the association between the one or more surface elements and the semantic information that is descriptive of the one or more geographic features.

Furthermore, the server computing system 130 can perform image content analysis on one or more inputs (e.g., image data including one or more images) that are provided to the server computing system 130. For example, the server computing system 130 can receive data, via the network 180. The data can include image data that includes one or more images and/or associated semantic information. The server computing system 130 can then perform various operations, which can include the use of the one or more machine-learned models 140, to detect one or more features of the one or more images and/or to associate semantic information with one or more images. By way of further example, the server computing system 130 can use object recognition techniques to detect one or more objects in an image (e.g., speed bumps, potholes, roads, curbs, sidewalks, buildings, street signs, construction barriers, and road markings) and generate semantic information based on recognition of the objects. In another example, the server computing system 130 can receive data from one or more remote computing systems (e.g., the one or more remote computing systems 170) which can include images that have been associated with semantic information (e.g., images with user associated semantic information and/or images with semantic information generated by a user device). The data received by the server computing system 130 can then be stored (e.g., stored in an image repository) for later use by the computing system 130.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-12.

The computing device 102 and/or the server computing system 130 can train the one or more machine-learned models 120 and/or 140 via interaction with the training computing system 150 that is communicatively connected and/or coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include image data that includes semantic information associated with one or more images and/or sensor data that includes sensor information associated with detection of one or more surfaces of the one or more locations. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the server computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, image data which can include one or more images and/or semantic information describing one or more locations and/or one or more features of the one or more locations. For example, the training data can include physical dimensions associated with a feature, the proximity of a feature to one or more points of reference (e.g., other locations), the geographic location of a feature (e.g., latitude, longitude, and/or altitude of a feature), and/or various metadata associated with the feature (e.g., a type associated with the feature including a type of surface and/or irregularity associated with a feature).

In some implementations, if the user has provided consent, the training examples can be provided by the computing device 102. Thus, in such implementations, the one or more machine-learned models 120 provided to the computing device 102 can be trained by the training computing system 150 on user-specific data received from the computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

Each of the one or more remote computing systems 170 includes one or more processors 172 and a memory 174. The one or more processors 172 can include any suitable processing device (e.g., a processor core, a microprocessor, an ASIC, a FPGA, a controller, and/or a microcontroller) and can include one processor or a plurality of processors that are operatively connected. The memory 174 can include one or more non-transitory computer-readable storage mediums, including RAM, ROM, EEPROM, EPROM, flash memory devices, magnetic disks, and combinations thereof. The memory 174 can store data 176 and instructions 178 which are executed by the processor 172 to cause the remote computing system 170 to perform operations.

In some implementations, the one or more remote computing systems 170 includes or is otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including image data that includes semantic information that can be associated with one or more locations and/or one or more features of the one or more locations. The one or more remote computing systems 170 can include a smart phone device that a user of the smart phone device can use to generate image data associated with one or more images captured by a camera or other image sensor of the smart phone device. For example, the user of the smart phone device can capture an image of a location (e.g., a road segment) that includes a latitude, longitude, and altitude of the location. The user can then manually annotate the image with semantic information that includes a description of the location (e.g., the size of a pothole) which can then be sent to the remote computing system 170 which includes a repository that can be used to store image data including the user provided image data. In some embodiments, the manually annotated image can be strongly encrypted, anonymized (e.g., any personal information associated with the image is either not collected or is deleted after being received), and maintained in a secure and privacy enhancing way for use by the remote computing system 170 which can provide the image and the associated semantic information for use an image content analysis portion of the remote computing system 170 and/or the training computing system 150.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the computing device 102 can include the model trainer 160 and the training data 162. In such implementations, the one or more machine-learned models 120 can be both trained and used locally at the computing device 102. In some of such implementations, the computing device 102 can implement the model trainer 160 to personalize the one or more machine-learned models 120 based on user-specific data.

Figure 2:
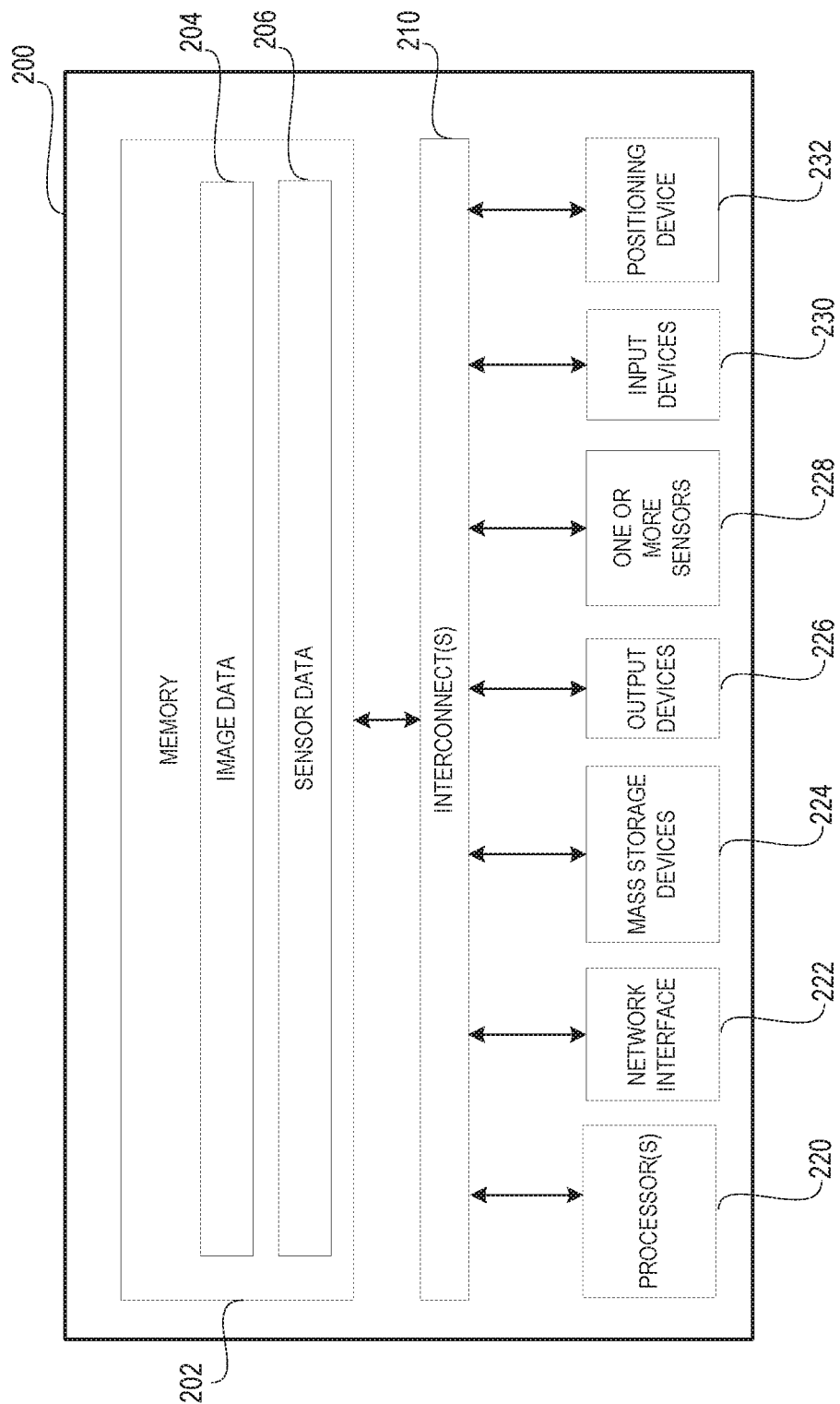
FIG. 2 depicts a diagram of an example device according to example embodiments of the present disclosure.

FIG. 2 depicts a diagram of an example device according to example embodiments of the present disclosure. A computing device 200 can include one or more features of the computing device 102, the server computing system 130, and/or the training computing system 150. Furthermore, the computing device 200 can perform one or more actions and/or operations including the one or more actions and/or operations performed by the computing device 102, the server computing system 130, and/or the training computing system 150, which are depicted in FIG. 1.

As shown in FIG. 2, the computing device 200 can include one or more memory devices 202, image data 204, sensor data 206, one or more interconnects 210, one or more processors 220, a network interface 222, one or more mass storage devices 224, one or more output devices 226, one or more sensors 228, one or more input devices 230, and or the positioning device 232.

The one or more memory devices 202 can store information and/or data (e.g., the image data 204 and/or the sensor data 206). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The image data 204 can include one or more portions of the data 116, the data 136, and/or the data 156 which are depicted in FIG. 1. Furthermore, the image data 204 can include information associated with one or more images, one or more maps of one or more locations, and/or semantic information associated with one or more descriptions of one or more locations.

The sensor data 206 can include one or more portions of the data 116, the data 136, and/or the data 156 which are depicted in FIG. 1. Furthermore, the sensor data 206 can include information associated with detection of one or more surfaces at the one or more locations.

The one or more interconnects 210 can include one or more interconnects or buses that can be used to send and/or receive one or more signals (e.g., electronic signals) and/or data (e.g., the image data 204 and/or the sensor data 206) between components of the computing device 200, including the one or more memory devices 202, the one or more processors 220, the network interface 222, the one or more mass storage devices 224, the one or more output devices 226, the one or more sensors 228 (e.g., sensor array), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the image data 204 and/or the sensor data 206. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the image data 204 and/or the sensor data 206. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras (e.g., cameras that can be used for the detection of surfaces including irregular surfaces).

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning service (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associate with the system 100 shown in FIG. 1. Further, the software applications that can be operated or executed by the computing device 200 can include native applications and/or web-based applications.

The positioning device 232 can include one or more devices or circuitry for determining the position of the computing device 200. For example, the positioning device 232 can an determine actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
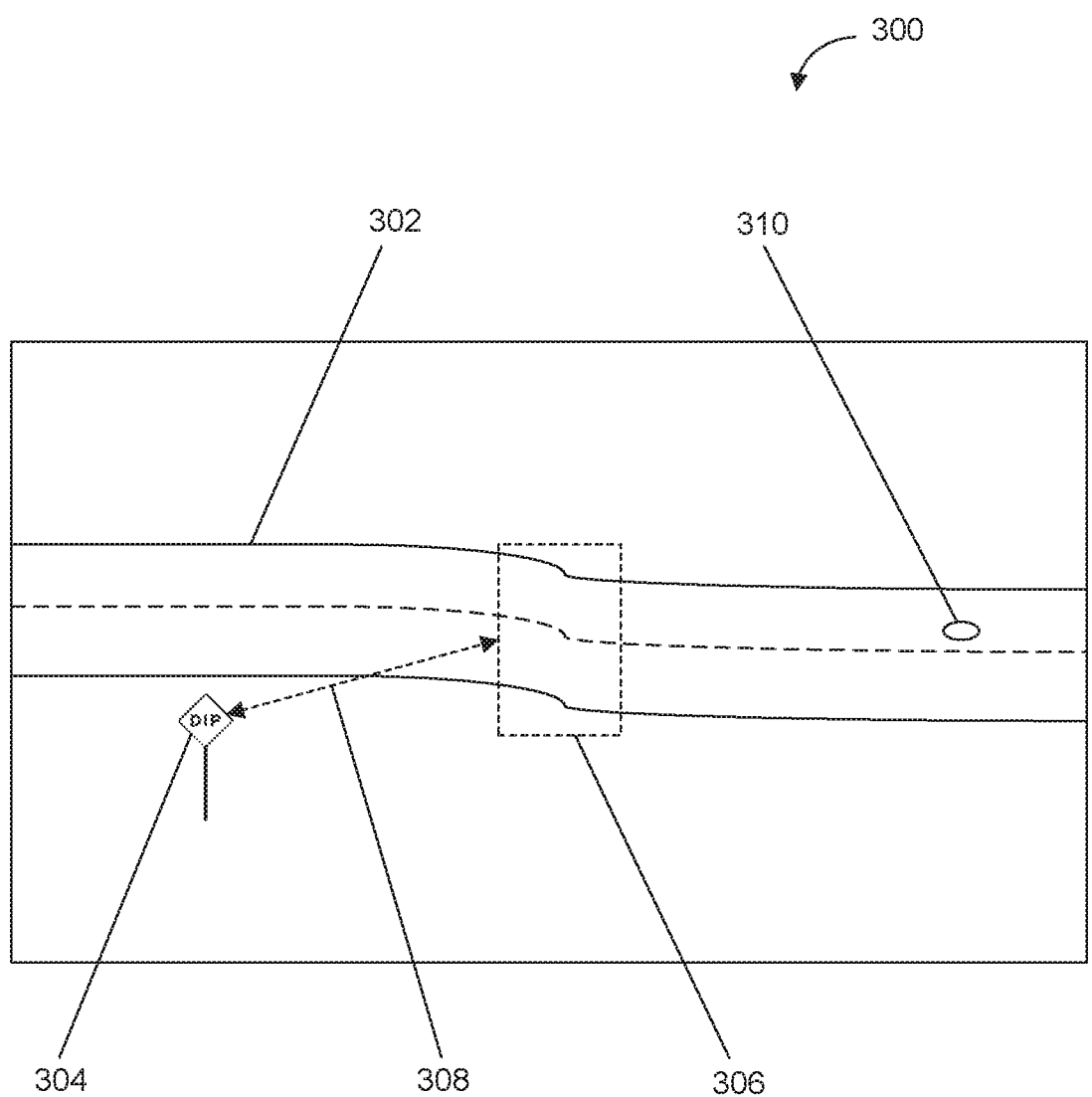
FIG. 3 depicts an example of feature detection according to example embodiments of the present disclosure.

FIG. 3 depicts an example of feature detection and image content analysis according to example embodiments of the present disclosure. The image illustrated in FIG. 3 can be accessed and/or processed by a computing system or computing device that includes one or more features of the computing device 102, the server computing system 130, and/or the training computing system 150, which are depicted in FIG. 1. As shown in FIG. 3, the image 300 includes a road surface feature 302, a sign feature 304, an irregular surface feature 306, a distance 308, and an irregular surface feature 310.

The image 300 depicts one or more features of an image upon which image content analysis has been performed including detection, identification, recognition, and/or analysis of one or more features of the image 300. In some embodiments, the image 300 can be a representation included in the image data 204 that is depicted in FIG. 2. Furthermore, the one or more features of the image 300, including the road surface feature 302, the sign feature 304, the irregular surface feature 306, the distance 308, and the irregular surface feature 310, can be associated with semantic information that can include descriptions of the one or more features. Furthermore, the image 300 can be associated with semantic information including one or more locations (e.g. latitude, longitude, and/or altitude) associated with one or more features depicted in the image 300.

In this example, the road surface feature 302 can be associated with semantic information indicating that the road surface feature 302 of the image 300 is a road surface. The semantic information associated with the road surface feature can also indicate the type of road surface associated with the road surface feature 302, which in this example is a paved road surface.

The sign feature 304 can be associated with semantic information indicating that the sign feature 304 is associated with a sign indicating a nearby dip in the road surface associated with the road surface feature 302. Further, the semantic information associated with the sign feature 304 can indicate the location of the sign feature 304.

The irregular surface feature 306 can be associated with semantic information indicating that the road surface associated with the irregular surface feature 306 is an irregular road surface. For example, the semantic information associated with the irregular surface feature 306 can indicate that the location associated with the irregular surface feature 306 is a dip in the road surface. Further, the semantic information associated with the irregular surface feature 306 can describe one or more aspects of the irregular surface feature 306. For example, the one or more aspects of the irregular surface feature 306 can include a gradient and/or physical dimensions including a length, width, and/or depth of the irregular surface feature 306.

The distance 308 can indicate the distance between the sign feature 304 and the irregular surface feature 306. For example, the distance 308 can indicate a distance in meters from the sign feature 304 to the portion of the irregular surface feature 306 that is closest to the sign feature 304. In some embodiments, the distance between the sign feature 304 and the irregular surface feature 306 can be used to determine whether an irregular surface feature is intentionally irregular or unintentionally irregular. When the distance 308 between the sign feature 304 and the irregular surface feature 306 is less than a distance threshold, the irregular surface feature 306 can be determined to be intentionally irregular. When the distance 308 between the sign feature 304 and the irregular surface feature 306 is greater than or equal to a distance threshold, the irregular surface feature 306 can be determined to be unintentionally irregular. In this example, the distance 308 between the sign feature 304 and the irregular surface feature 306 is close enough that the irregular surface feature 306, which may be a dip in the road designed to control the conveyance of water on the road surface, is determined to be an intentionally irregular surface.

The irregular surface feature 310 can be associated with semantic information indicating that the road surface associated with the irregular surface feature 310 is an irregular road surface. For example, the semantic information associated with the irregular surface feature 310 can indicate that the area associated with the irregular surface feature 310 is a pothole in the road surface. In some embodiments, the description in the semantic information associated with the irregular surface feature 310 can be based at least in part on inputs from user's who have driven over the irregular surface feature 310 and indicated that there is a pothole at that location. Further, the semantic information associated with the irregular surface feature 310 can describe one or more physical dimensions of the irregular surface feature 310 including a depth, length, and/or width of the irregular surface feature 310.

Figure 4:
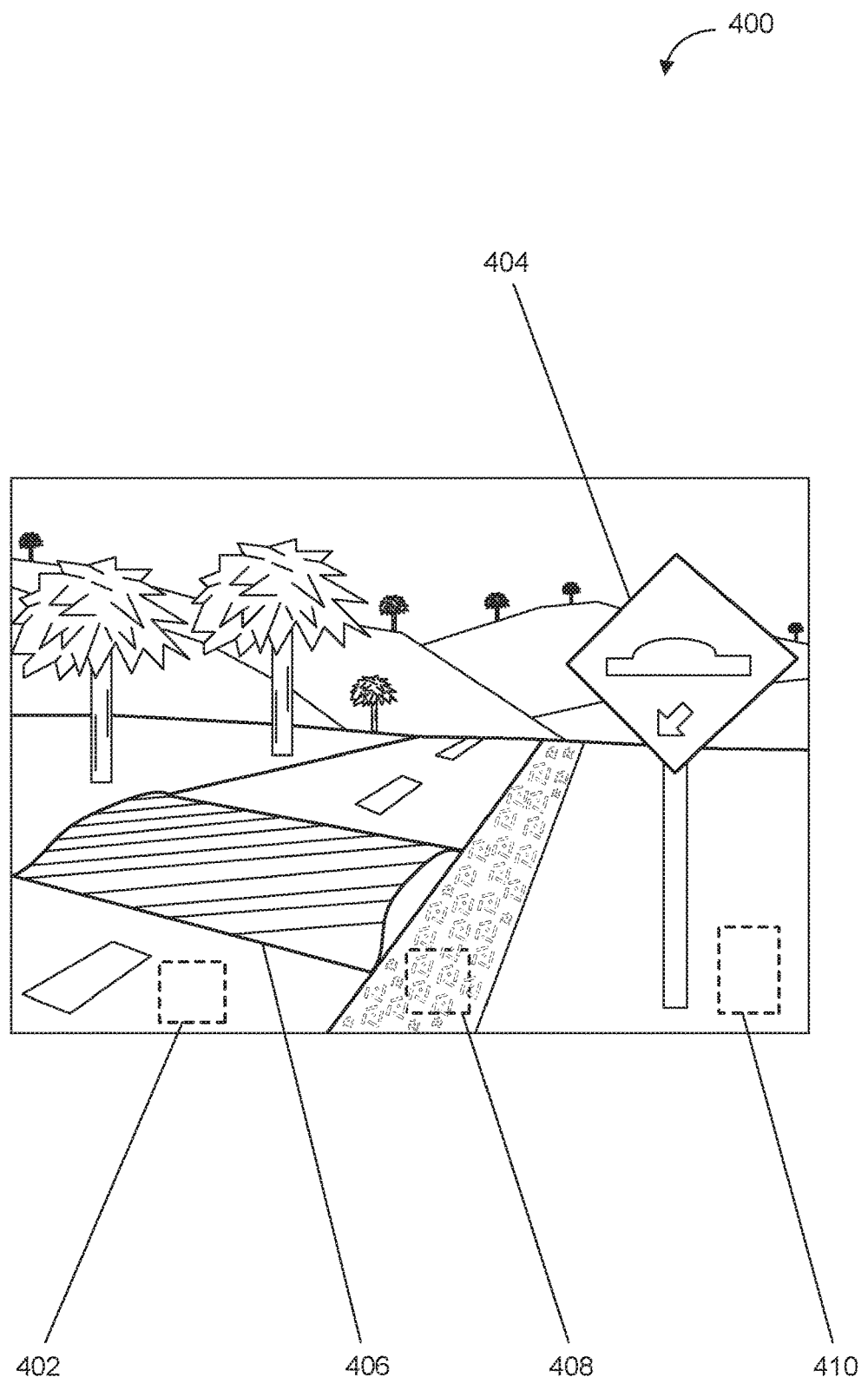
FIG. 4 depicts an example of feature detection according to example embodiments of the present disclosure.

FIG. 4 depicts an example of feature detection and image content analysis according to example embodiments of the present disclosure. The image illustrated in FIG. 4 can be generated and/or determined by a computing system or computing device that includes one or more features of the computing device 102, the server computing system 130, and/or the training computing system 150, which are depicted in FIG. 1. As shown in FIG. 4, the image 400 includes a surface feature 402, a sign feature 404, an irregular surface feature 406, a surface feature 408, and/or a surface feature 410.

The image 400 depicts one or more features of an image upon which image content analysis has been performed including detection, identification, recognition, and/or analysis of one or more features of the image 400. In some embodiments, the image 400 can be a representation included in the image data 204 that is depicted in FIG. 2. Furthermore, the one or more features of the image 400, including the surface feature 402, the sign feature 404, the irregular surface feature 406, the surface feature 408, and/or the surface feature 410, can be associated with semantic information that can include descriptions of the one or more features. The image 400 can also be associated with semantic information including one or more locations (e.g. latitude, longitude, and/or altitude) of one or more features depicted in the image 400.

In this example, the surface feature 402 can be associated with semantic information indicating that the surface feature 402 portion of the image 400 is a road surface. The semantic information associated with the road surface feature can also indicate the type of road surface associated with the surface feature 402, which in this example is a paved road surface type.

The sign feature 404 can be associated with semantic information indicating that the sign feature 404 is associated with a sign indicating a speed bump in the road surface associated with the surface feature 402.

The irregular surface feature 406 can be associated with semantic information indicating that the road surface associated with the irregular surface feature 406 is an irregular road surface. The semantic information associated with the irregular surface feature 406 can indicate that the area associated with the irregular surface feature 406 is a speed bump in the road surface. Further, the semantic information associated with the irregular surface feature 406 can describe one or more aspects of the irregular surface feature 406 including a height, length, and/or width of the irregular surface feature 406. In some embodiments, the painted striped markings on the irregular surface feature 406 and/or the proximity of the sign feature 404 to the irregular surface feature 406 can be used to determine that the irregular surface feature 406 is an intentionally irregular feature.

The surface feature 408 can be associated with semantic information indicating that the surface feature 408 portion of the image 400 is a road surface and that the type of road surface associated with the surface feature 408 is a gravel road surface type. In some embodiments, some types of road surface are determined to be irregular surfaces. In this example, the surface feature 408 is determined to be an intentionally irregular surface because it is gravel.

The surface feature 410 can be associated with semantic information indicating that the surface feature 410 portion of the image 400 is a field and that the type of field associated with the surface feature 410 is a an irregular field type. In this example, the surface feature 410 is determined to be an unintentionally irregular surface because it is an irregular field. By way of contrast, semantic information indicative of a flat field used for sporting events may not be associated with an irregular surface type.

Figure 5:
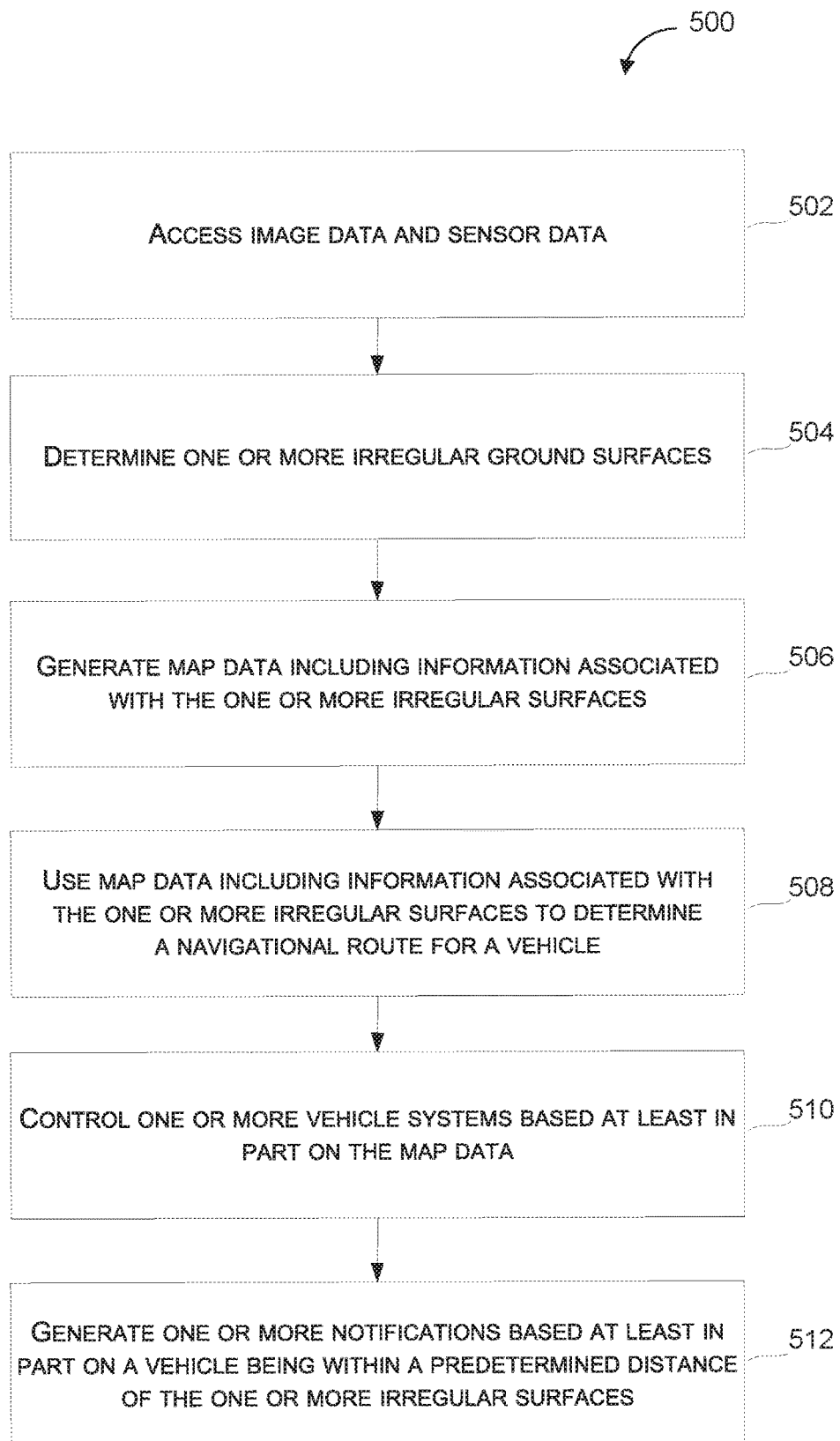
FIG. 5 depicts a flow diagram of surface mapping according to example embodiments of the present disclosure.

FIG. 5 depicts a flow diagram of an example method for generating surface maps according to example embodiments of the present disclosure. One or more portions of the method 500 can be executed or implemented on one or more computing devices or computing systems including, for example, the computing device 102, the server computing system 130, and/or the training computing system 150. Further, one or more portions of the method 500 can be executed or implemented as an algorithm on the hardware devices or systems disclosed herein. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 502, the method 500 can include accessing image data and/or sensor data. The image data can include a plurality of images of one or more locations and/or semantic information associated with the one or more locations. Further, the semantic information can include information descriptive of one or more features associated with the one or more locations. For example, the image data can include one or more images including raster images, voxel images, and/or vector images that are associated with semantic information describing one or more features depicted in the one or more images, including buildings, roads, road surface types, curbs, sidewalks, traffic lights, and/or road signs.

In some embodiments, the image data can include semantic information associated with one or more road signs including one or more speed bump signs, one or more barricade signs, and/or one or more construction signs. The semantic information associated with the one or more road signs can include one or more locations and one or more road sign types of the one or more road signs.

The sensor data can include sensor information associated with detection of one or more surfaces at the one or more locations by one or more sensors. For example, the one or more sensors can generate a plurality of sensor outputs associated with detection of one or more surfaces in the one or more locations. For example, the sensor data can include LiDAR point cloud data associated with ground surfaces, including roads, of each of the one or more locations.

In some embodiments, the one or more sensors can include one or more light detection and ranging (LiDAR) devices configured to generate sensor data based at least in part on a LiDAR scan of the one or more surfaces of the one or more locations.

In some embodiments, the image data can be based at least in part on image content analysis of one or more images. The image content analysis can be performed by a computing system that analyzes the semantic content of an image and generates semantic information including a description of the features found in the image. By way of example, the image content analysis can use one or more machine-learned models that have been configured and/or trained to detect and identify one or more features in an image. The image data can also be associated with corpus of street-level imagery that includes images captured from a street level perspective. Further, the system can utilize the image content analysis of street level imagery and/or other images including user-generated imagery and/or publicly accessible street-level imagery for the purpose of determining the locations of irregular surfaces and objects associated with irregular surfaces including signage indicating the proximity of an irregular surface. In one embodiment, the semantic information includes one or more geographic locations of one or more features in an image.

The image data can also include semantic information associated with one or more locations of roads, buildings, bodies of water, bridges, tunnels, overpasses, and/or underpasses. The image data can also include semantic information associated with traffic regulations associated with one or more locations which can include the one or more locations of intentionally irregular surfaces including speed bumps, curbs, and/or other structures that are intentionally designed to enforce traffic regulations.

In some embodiments, any portion of the semantic information can include a date and/or time of date at which each portion of the semantic information was generated, modified, deleted, and/or accessed.

In some embodiments, the semantic information can be descriptive of one or more features at the one or more locations. For example, the semantic information can include numerical and textual descriptions of the one or more features at the one or more locations including: physical dimensions of one or more objects at the one or more locations; and/or identifying information describing types of objects at the one or more locations.

In some embodiments, the semantic information can be associated with one or more features depicted by an image of the one or more images. For example, the semantic information can include descriptions of one or more objects included within a scene depicted by the one or more images. Further, the one or more images can include one or more two-dimensional images. Further, the one or more images can be encoded in any type of image format including a combination of raster images (e.g., bitmaps comprising an array of pixels), voxel images, and/or vector images (e.g., polygonal representations of images based on positions of coordinates including x and y axes of a two-dimensional plane). The images can also include still images, image frames from a movie, and/or other types of imagery including LiDAR imagery, and/or RADAR imagery.

Examples of digital image formats used by the plurality of images can include JPEG (Joint Photographic Experts Group), BMP (Bitmap), TIFF (Tagged Image File Format), PNG (Portable Network Graphics), and/or GIF (Graphics Interchange Format). The images can be collected from various sources including user-submitted imagery, imagery in the public domain (e.g., anonymized imagery obtained via web crawl), and/or street-level panoramic imagery.

By way of example, the computing device 102 can access data including the image data and the sensor data from the server computing system 130 via the network 180. In another embodiment, the computing device 102 can access the data 116 which includes the image data and the sensor data and is locally stored on the memory 114.

At 504, the method 500 can include determining one or more irregular surfaces of the one or more locations based at least in part on the image data and/or the sensor data. The one or more irregular surfaces can include the one or more surfaces that satisfy one or more irregular surface criteria. The computing device 102 can determine that there are one or more irregular surfaces at a location based at least in part on semantic information that describes an irregular surface at a location. For example, the computing device 102 can determine that there are one or more irregular surfaces at a location based on semantic information including the word "pothole" associated with a location. Further, the computing device 102 can determine that there are one or more irregular surfaces at a location based at least in part on sensor information that is indicative of an irregular surface at a location. For example, the computing device 102 can determine that there are one or more irregular surfaces at a location based on sensor information from a LiDAR device that indicates that there is an irregular depression in a road surface at a location. The computing device 102 can determine the one or more irregular surfaces at the one or more locations based at least in part on some combination of the image data and/or the sensor data indicating that there is an irregular surface at the one or more locations.

Satisfying the one or more irregular surface criteria can include determining that the semantic information and the sensor information are indicative of an irregular surface at a location. For example, the computing device 102 can access image data indicating the word "pothole" in association with a location and sensor data indicating spatial characteristics of a location that correspond to a pothole. Satisfying the one or more irregular surface criteria can include both the image data and the semantic data indicating that there is a pothole (an irregular surface) at a location.

In some embodiments, the one or more irregular surface criteria are satisfied when both the image data and the sensor data are indicative of an irregular surface. For example, the one or more irregular surface criteria can be satisfied when both the image data and the sensor data indicate a speed bump at a location.

In some embodiments, the one or more irregular surface criteria are satisfied when the image data is indicative of one or more irregular surfaces and the sensor data does not contradict the existence of the one or more irregular surfaces; or the sensor data is indicative of one or more irregular surfaces and the image data does not contradict the existence of the one or more irregular surfaces. For example, the one or more irregular surface criteria can be satisfied when the image data indicates a speed bump at a location and the sensor data does not indicate that the location is a smooth surface without a speed bump. By way of further example, the one or more irregular surface criteria can be satisfied when the sensor data is indicative of a speed bump at a location and the image data does not include semantic information describing the location as a smooth surface without a speed bump.

At 506, the method 500 can include generating map data that can include information associated with the one or more irregular surfaces. Further, the map data can include information associated with the one or more locations of the one or more irregular surfaces. For example, the computing device 102 can access the image data and the sensor data to provide information including the geographic location of an irregular surface and a corresponding description of the irregular surface based at least in part on the semantic information. Furthermore, the map data can include a timestamp associated with each of the one or more irregular surfaces to indicate a date and/or time of day at which the image data and/or the sensor data associated with each of the one or more irregular surfaces was initially and/or most recently generated or modified.

In some embodiments, the map data can include a latitude associated with each of the one or more irregular surfaces, a longitude associated with each of the one or more irregular surfaces, an altitude associated with each of the one or more irregular surfaces, a height of each of the one or more irregular surfaces with respect to a surrounding surface, a depth of each of the one or more irregular surfaces with respect to a surrounding surface, a volume of each of the one or more irregular surfaces, and/or a surface area of each of the one or more irregular surfaces.

In some embodiments, the computing device 102 can send the map data to a remote computing system associated with updating the image data or the sensor data. For example, the computing device 102 can send the map data to the server computing system 130 via the network 180. In this example, the server computing system 130 can use the map data to provide notifications indicating the locations of irregular surfaces to travelers in vehicles.

At 508, the method 500 can include using the map data comprising information associated with the one or more irregular surfaces to determine a navigational route for a vehicle. For example, the computing device 102 can access the map data that is locally stored in the memory 114 of the computing device 102 and/or receive the map data from the server computing system. The computing device 102 can then determine a location of a vehicle associated with the computing device 102 and determine a navigational route from the location of the vehicle to a destination based at least in part on the map data. For example, the computing device 102 can use the map data to determine the locations of irregular road surfaces in a geographic region and determine the navigational route based on criteria including the navigational route that includes the fewest irregular surfaces, or the navigational route that does not include irregular surfaces that exceed a threshold height or threshold depth.

At 510, the method 500 can include controlling one or more vehicle systems of a vehicle based at least in part on the map data. The one or more vehicle systems can include one or more motor systems, one or more steering systems, one or more braking systems, one or more notification systems, and/or one or more lighting systems. For example, the server computing system 130 can generate the map data and send the map data to the computing device 102, which can be located on a vehicle. The computing device 102 can use the map data to determine that there is an irregular surface (e.g., a bumpy road surface) ahead and can then control notification systems including a loudspeaker that is used to announce that the road ahead is bumpy to a passenger of the vehicle. In another example, the computing device 102 can control the engine system of an autonomous vehicle to slow the autonomous vehicle down before the autonomous vehicle traverses a speed bump indicated by the map data. By way of further example, the computing device 102 can use the map data to determine that there is an irregular surface (e.g., a pothole) ahead and can then control the braking system of an autonomous vehicle to stop the autonomous vehicle before the autonomous vehicle passes over a large pothole indicated by the map data.

At 512, the method 500 can include generating data associated with implementing one or more indications based at least in part on a vehicle being within a predetermined distance of the one or more irregular surfaces. The one or more indications can include one or more visual indications, one or more maps that can include the one or more locations of the one or more irregular surfaces, one or more textual descriptions of the one or more irregular surfaces, and/or one or more auditory indications associated with the one or more irregular surfaces.

For example, the computing device 102 can generate one or more visual indications including a flashing light to indicate to a passenger that one or more irregular surfaces are within the predetermined distance to a passenger of the vehicle. In another example, the computing device 102 can generate one or more visual indications including one or more images of the one or more irregular surfaces based at least in part on one or more images of the one or more irregular surfaces from the image data.

Figure 6:
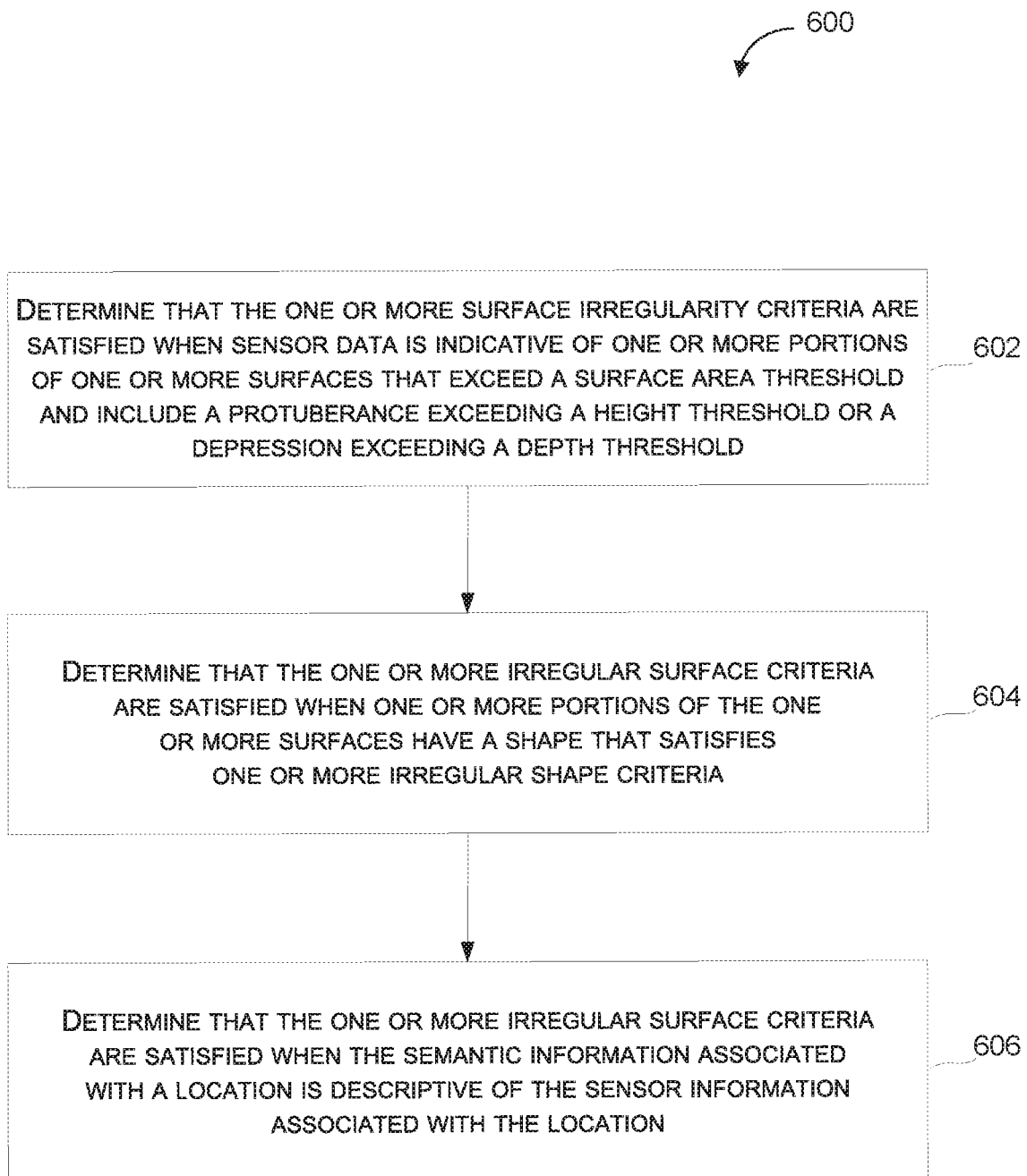
FIG. 6 depicts a flow diagram of surface mapping according to example embodiments of the present disclosure.

FIG. 6 depicts a flow diagram of an example method for generating surface maps according to example embodiments of the present disclosure. One or more portions of the method 600 can be executed or implemented on one or more computing devices or computing systems including, for example, the computing device 102, the server computing system 130, and/or the training computing system 150. Further, one or more portions of the method 600 can be executed or implemented as an algorithm on the hardware devices or systems disclosed herein. In some embodiments, one or more portions of the method 600 can be performed as part of the method 500 that is depicted in FIG. 5. Further, one or more portions of the method 600 can be performed as part of determining the one or more irregular surfaces based at least in part on the image data and the sensor data as described in 504 of the method 500 that is depicted in FIG. 5. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include determining that the one or more irregular surface criteria are satisfied when the sensor data is indicative of one or more portions of the one or more surfaces that exceed a surface area threshold and include a protuberance that exceeds a surface area threshold and/or a depression that exceeds a depth threshold. For example, the computing device 102 can use the sensor data to determine three-dimensional features of the one or more surfaces including geometric properties of the one or more surfaces. Based on the three-dimensional features of the one or more surfaces, the computing device 102 can determine that a surface that is semi-circular, twenty centimeters in length, and three meters wide is an irregular surface.

In some embodiments, the height threshold can be based at least in part on a height of a protuberance above an average height of a surface of the one or more surfaces. For example, the height threshold can be based at least in part on a height above an average height of one or more surfaces in a predetermined area. For example, the computing device 102 can access the sensor data to determine that the height of a protuberance in a predetermined area measuring one square meter is three centimeters higher than a ground surface surrounding the predetermined area. Further, the depth threshold can be based at least in part on a depth of a depression below an average depth of a surface of the one or more surfaces surrounding the one or more portions of the one or more surfaces. For example, the depth threshold can be based at least in part on a depth below an average height of one or more surfaces within a predetermined area. For example, the computing device 102 can access the sensor data to determine that the depth of a depression in a predetermined area measuring one square meter area is two centimeters lower than a ground surface surrounding the predetermined area.

In some embodiments, the height threshold can be based at least in part on a height of a protuberance with respect to the surface within a predetermined distance of the protuberance. For example, the computing device 102 can access the sensor data to determine that the height of a protuberance is five centimeters higher than a ground surface in a one meter radius around the protuberance. Further, in some embodiments, the depth threshold can be based at least in part on a depth of a depression with respect to the surface within a predetermined distance of the depression. For example, the computing device 102 can access the sensor data to determine that the depth of a depression is four centimeters lower than a ground surface in a one meter radius around the depression.

At 604, the method 600 can include determining when one or more portions of the one or more surfaces have a shape that satisfies one or more irregular shape criteria associated with irregularity in a length of sides of the one or more surfaces and/or irregularity in angles of the one or more surfaces. For example, the computing device 102 can access sensor data that can be used to determine spatial characteristics including three-dimensional characteristics of one or more portions of a surface. The spatial characteristics of a portion of surface that is not irregular can include rectangular sections of concrete blocks with evenly shaped corners. By way of contrast, the spatial characteristics of an irregular portion of surface can include jagged edges of unequal length.

By way of further example, the computing device 102 can access image data that can be used to determine spatial characteristics of one or more portions of a surface. The spatial characteristics of a portion of surface that is not irregular (a portion that is regular) can include square sections of concrete blocks with equal length sides. By way of contrast, the spatial characteristics of an irregular portion of surface can include variously shaped sections of a surface with edges of unequal length.

At 606, the method 600 can include determining that the one or more irregular surface criteria are satisfied when the semantic information associated with a location of the one or more locations is descriptive of the sensor information associated with the detection of the one or more surfaces by the one or more sensors. For example, the computing device 102 can access the semantic information associated with a location to determine when the semantic information includes a description of potholes at the location. Satisfying the one or more irregular surface criteria can include determining that the semantic information indicates that there are potholes at the location and that the sensor information is based on detection of a ground surface of the location that has spatial characteristics corresponding to a pothole.

Figure 7:
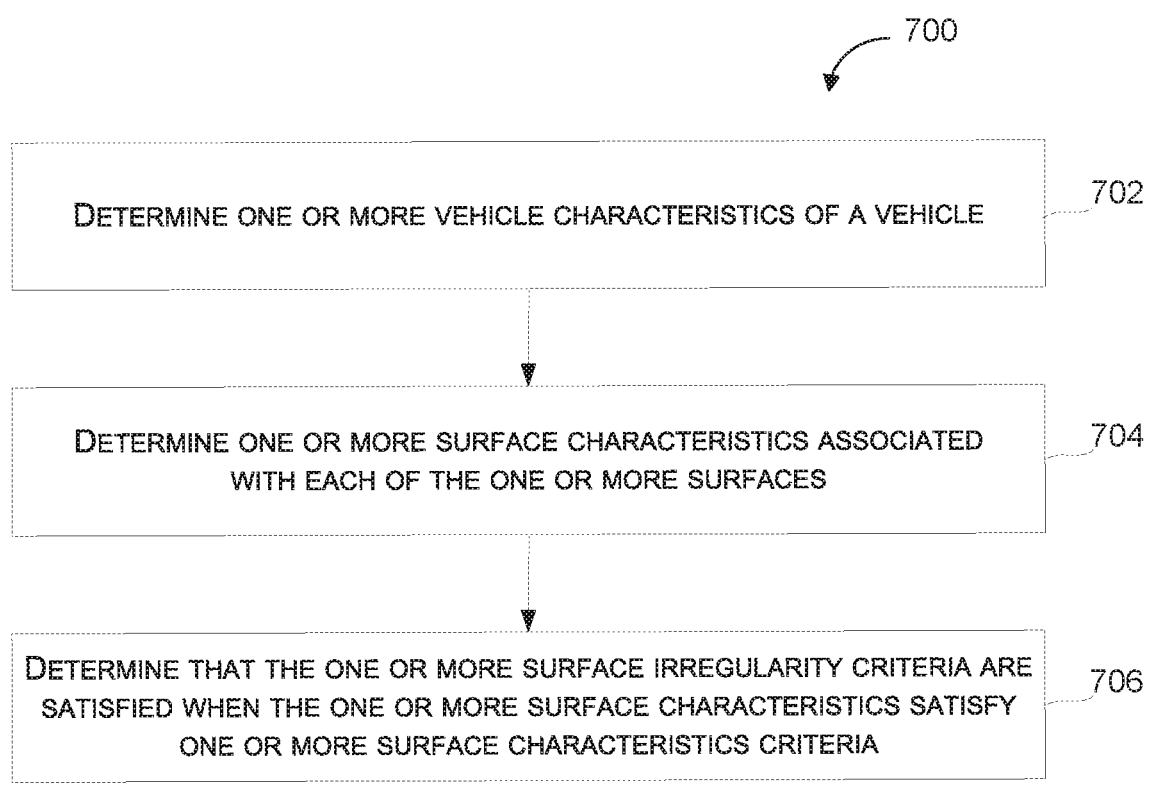
FIG. 7 depicts a flow diagram of surface mapping according to example embodiments of the present disclosure.

FIG. 7 depicts a flow diagram of an example method for generating surface maps according to example embodiments of the present disclosure. One or more portions of the method 700 can be executed or implemented on one or more computing devices or computing systems including, for example, the computing device 102, the server computing system 130, and/or the training computing system 150. Further, one or more portions of the method 700 can be executed or implemented as an algorithm on the hardware devices or systems disclosed herein. In some embodiments, one or more portions of the method 700 can be performed as part of the method 500 that is depicted in FIG. 5. Further, one or more portions of the method 700 can be performed as part of determining the one or more irregular surfaces based at least in part on the image data and the sensor data as described in 504 of the method 500 that is depicted in FIG. 5. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining one or more vehicle characteristics of a vehicle. In some embodiments, the one or more vehicle characteristics can include a ground clearance of the vehicle, a height of a vehicle, a width of a vehicle, a distance between a front wheel of the vehicle and a front bumper of the vehicle, and/or a firmness of the vehicle's suspension system. For example, the ground clearance of the vehicle can include a distance between the lowest point of a vehicle's chassis, external body panel, or undercarriage and a flat surface below the vehicle's tires. For example, the computing device 102 can determine a ground clearance of a vehicle based at least in part on accessing vehicle data including physical characteristics of the vehicle including a ground clearance of the vehicle. In some embodiments, the one or more vehicle characteristics of the vehicle can include physical dimensions of the vehicle and/or physical dimensions of the vehicle and any objects attached to, or carried by, the vehicle. For example, a vehicle carrying a bicycle on the vehicle's roof can include the bicycle's physical dimensions in the determination of the vehicle's height.

At 704, the method 700 can include determining one or more surface characteristics associated with each of the one or more surfaces. The one or more surface characteristics can include one or more gradients associated with the one or more surfaces and/or a surface height associated with the one or more surfaces. For example, the computing device 102 can use the sensor data associated with detection of one or more surfaces to determine one or more gradients including the angle of a surface with respect to an adjacent surface that is within a predetermined distance of the one or more surfaces. By way of further example, the computing device 102 can determine one or more gradients of a surface based at least in part on analysis of image data that indicates the angle of a surface relative to one or more other surfaces. In some embodiments, the semantic information can include information associated with one or more gradients and/or one or more heights of one or more surfaces at one or more locations.

At 706, the method 700 can include determining that the one or more irregular surface criteria are satisfied when the one or more surface characteristics associated with each of the one or more surfaces satisfy one or more surface characteristics criteria. For example, satisfying the one or more surface characteristic criteria can include determining that one or more gradients associated with each of the one or more surfaces exceed a gradient threshold. In this way, the front portion of a vehicle with low ground clearance will not come into contact with a surface that has a steep gradient. By way of further example, satisfying the one or more surface characteristics can include determining that the height of the one or more surfaces exceeds the height of the vehicle by a predetermined distance. In this way, the top of a vehicle will not come into contact with an overhead surface such as for example, a tunnel entrance or the entrance of a parking garage.

The one or more surface characteristic criteria can be based at least in part on the one or more characteristics of the vehicle. For example, the one or more surface characteristic criteria including a gradient threshold can be more readily satisfied for an off-road vehicle with a high ground clearance and a high gradient threshold than for a sports car with a relatively low ground clearance and a low gradient threshold.

Figure 8:
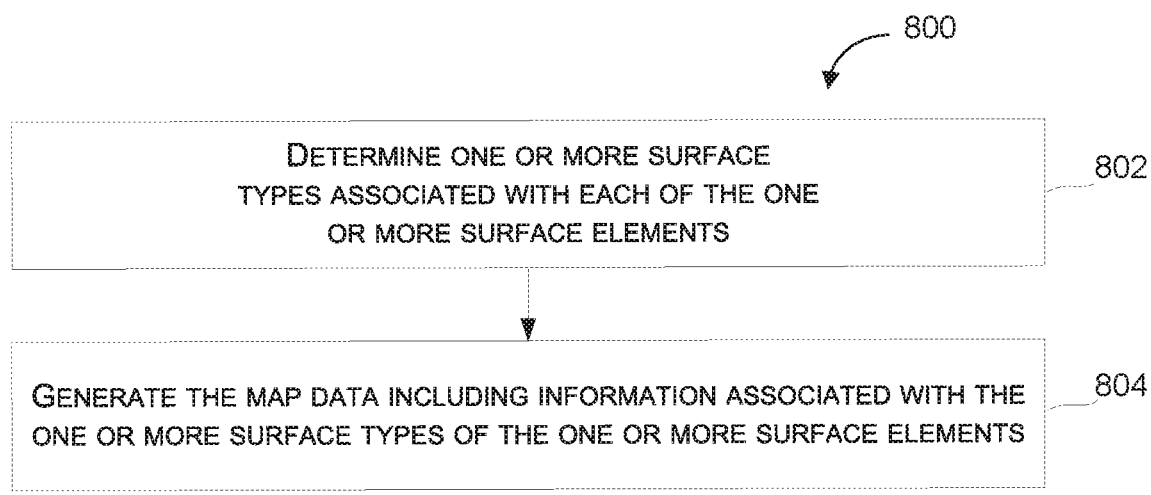
FIG. 8 depicts a flow diagram of surface mapping according to example embodiments of the present disclosure.
Figure 12:
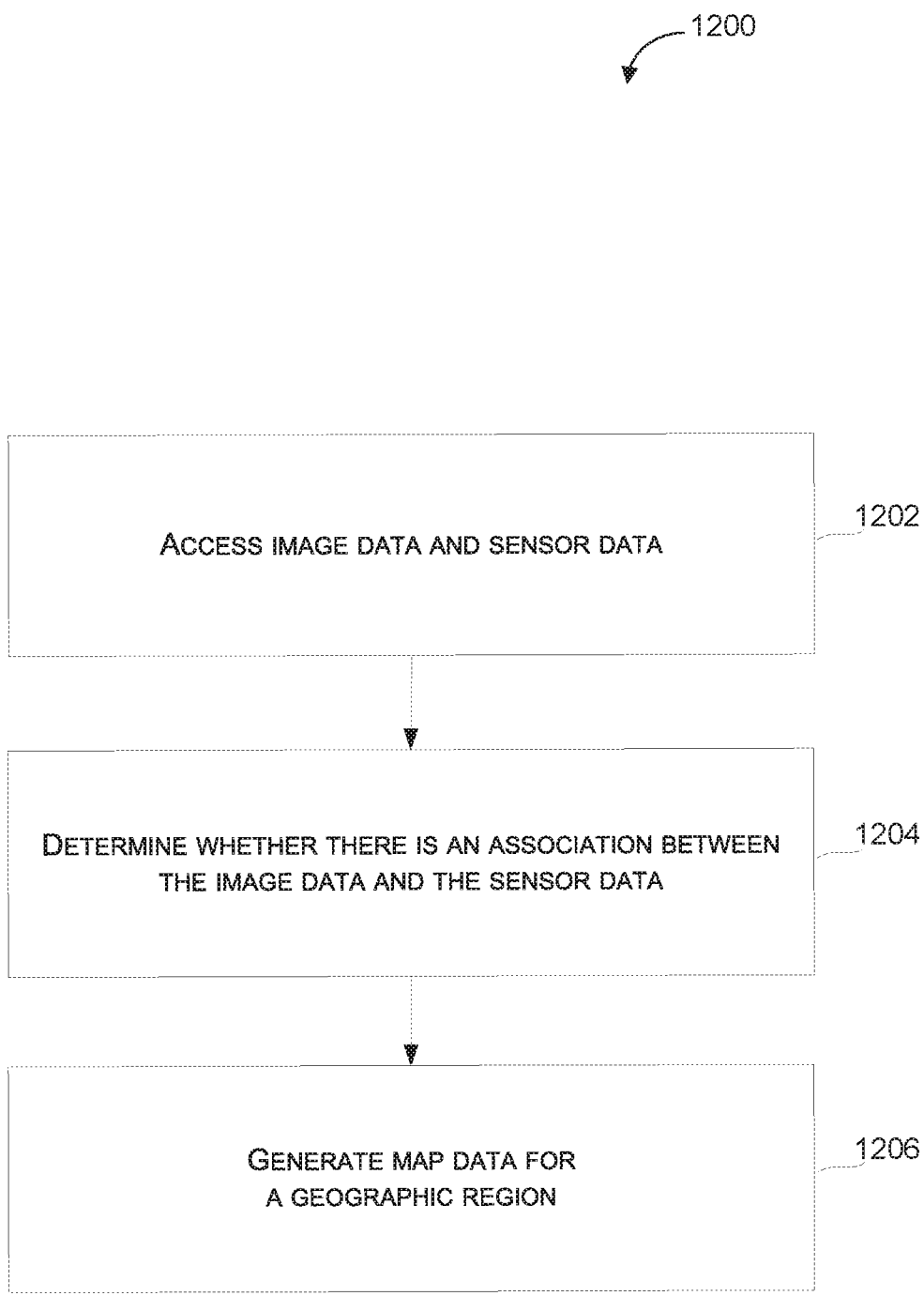
FIG. 12 depicts a flow diagram of providing machine-learned models according to example embodiments of the present disclosure.

FIG. 8 depicts a flow diagram of an example method for generating surface maps according to example embodiments of the present disclosure. One or more portions of the method 800 can be executed or implemented on one or more computing devices or computing systems including, for example, the computing device 102, the server computing system 130, and/or the training computing system 150. Further, one or more portions of the method 800 can be executed or implemented as an algorithm on the hardware devices or systems disclosed herein. In some embodiments, one or more portions of the method 800 can be performed as part of the method 1200 that is depicted in FIG. 12. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining one or more surface types associated with each of the one or more surface elements. In some embodiments, the one or more surface types can include one or more ground surfaces or one or more non-ground surfaces. The one or more ground surfaces can include one or more paved ground surfaces, one or more unpaved ground surfaces, one or more sidewalk surfaces, and/or one or more gravel surfaces. In some embodiments, the one or more non-ground surfaces can include one or more lateral surfaces and/or one or more overhead surfaces. The one or more lateral surfaces can include one or more walls, fences, and/or other surfaces that are vertically aligned. The one or more overhead surfaces can include one or more surfaces that are above some predetermined height threshold including the upper portions of gates, tunnel entrances, garage entrances, doorways, and/or overhead barriers.

For example, the computing device 102 can determine the one or more surface types based at least in part on semantic information associated with the image data, which can indicate whether a surface is a ground surface, for example a road, or a non-ground surface, for example a building. By way of further example, the computing device 102 can use the sensor data to determine one or more spatial characteristics of a surface that correspond to one or more surface types.

In some embodiments, the image data can include semantic information associated with physical dimensions of an overhead surface including a height of an overhead surface. Further, the image data can include semantic information associated with the type and material properties of the overhead surface. For example, the semantic data can indicate that the overhead surface is the entrance of a parking garage.

In some embodiments, the image data can include semantic information associated with a description of one or more features of a surface. For example, a surface can be described as "bumpy" or "smooth".

At 804, the method 800 can include generating map data that includes information associated with the one or more surface types of each of the one or more locations. The map data can indicate the surface type of the one or more locations within a particular set of geographic coordinates. For example, the computing device 102 can generate map data that includes a representation of a geographic area in which each of the geographic area's one or more locations is associated with one or more surface types.

Figure 9:
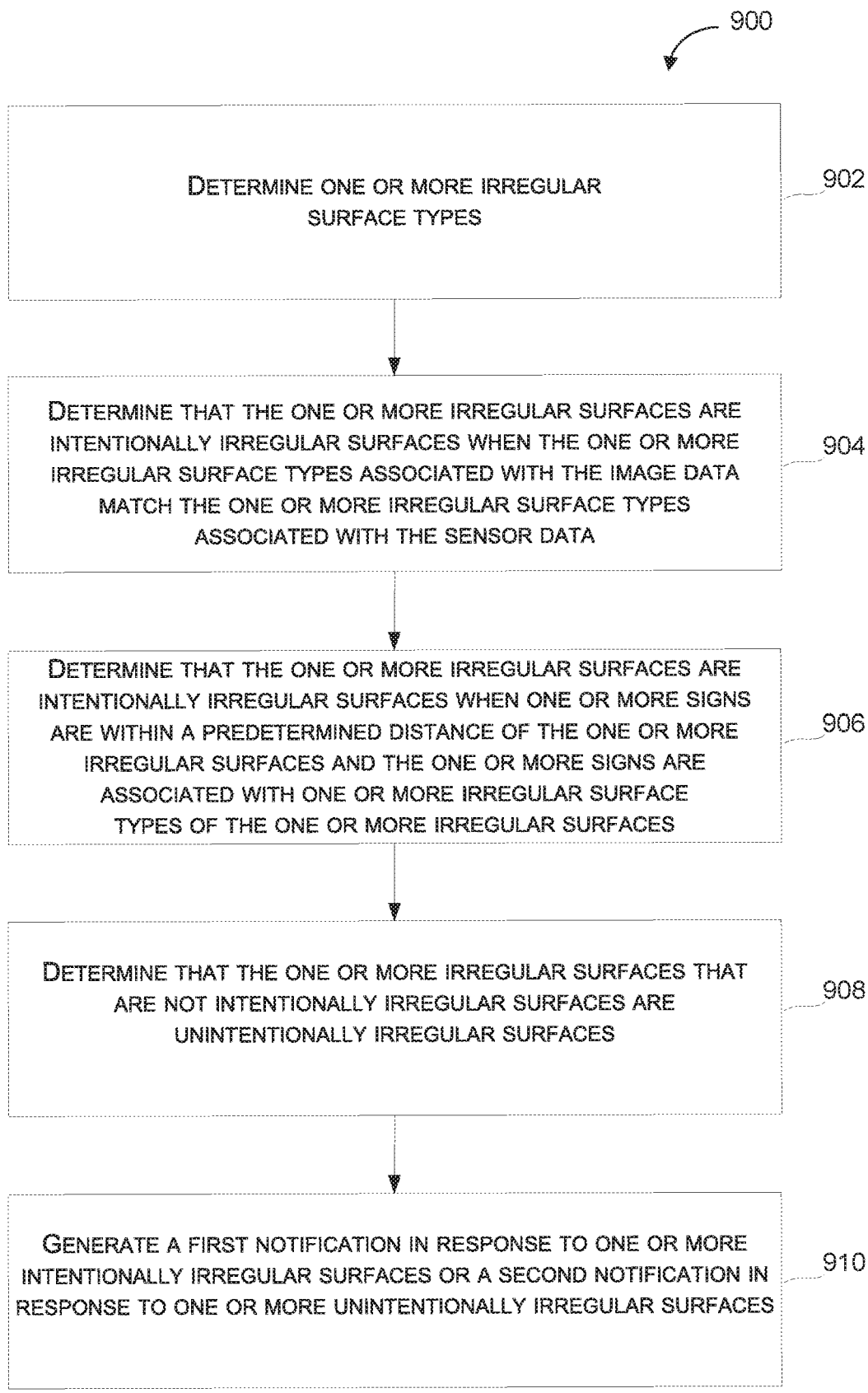
FIG. 9 depicts a flow diagram of surface mapping according to example embodiments of the present disclosure.

FIG. 9 depicts a flow diagram of an example method for generating surface maps according to example embodiments of the present disclosure. One or more portions of the method 900 can be executed or implemented on one or more computing devices or computing systems including, for example, the computing device 102, the server computing system 130, and/or the training computing system 150. Further, one or more portions of the method 900 can be executed or implemented as an algorithm on the hardware devices or systems disclosed herein. In some embodiments, one or more portions of the method 900 can be performed as part of the method 500 that is depicted in FIG. 5. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining, based at least in part on the image data and the sensor data, one or more irregular surface types associated with each of the one or more irregular surfaces. For example, the computing device 102 can determine the one or more irregular surface types based at least in part on semantic information associated with the image data, which can indicate when a ground surface is part of a construction zone. By way of further example, the computing device 102 can use the sensor data to determine one or more spatial characteristics of a ground surface that correspond to one or more irregular surface types including curbs, speed bumps, and/or potholes.

At 904, the method 900 can include determining that the one or more irregular surfaces are intentionally irregular surfaces when the one or more irregular surface types associated with the image data for an irregular surface of the one or more irregular surfaces match the one or more irregular surface types associated with the sensor data for the irregular surface. An intentionally irregular surface can include a structure or surface formation that is intentionally built at a particular location. A curb and/or a speedbump are examples of intentionally irregular surfaces. For example, the computing device 102 can determine that an irregular surface is intentionally irregular when both the image data and the sensor data indicate that the irregular surface type is a speed bump.

At 906, the method 900 can include determining that the one or more irregular surfaces are intentionally irregular surfaces when one or more signs are within a predetermined distance of the one or more irregular surfaces and the one or more signs are associated with one or more irregular surface types of the one or more irregular surfaces. For example, the computing device 102 can use semantic information associated with the image data to determine the location of road signs in a particular location. Further, the computing device 102 can determine that an irregular surface is an intentionally irregular surface when a road sign indicating "DIP" is within thirty meters of an irregular surface that is determined to be a road dip based on the sensor data.

At 908, the method 900 can include determining that the one or more irregular surfaces that are not intentionally irregular surfaces are unintentionally irregular surfaces. An unintentionally irregular surface can include a surface feature that results from deterioration and/or damage to a surface and/or a structure that is not intentionally built at a particular location. Further, an unintentionally irregular surface can include an incompletely constructed surface that is under construction. A pothole or a collection of bricks that have fallen on a road surface are examples of intentionally irregular surfaces.

At 910, the method 900 can include generating a first notification in response to the one or more intentionally irregular surfaces and/or a second notification in response to the one or more unintentionally irregular surfaces. For example, the computing device 102 can generate one or signals that cause a display device to display a first notification ("SPEED BUMP AHEAD") when an intentionally irregular surface is detected and a second notification ("POTHOLE AHEAD") when an unintentionally irregular surface is detected. In some embodiments, the first notification and the second notification can be associated with a different type of indication. For example, the first notification can be a visual indication (e.g., a notification message displayed on a display device) and the second notification can be an auditory indication (e.g., an auditory message generated through a loudspeaker).

Figure 10:
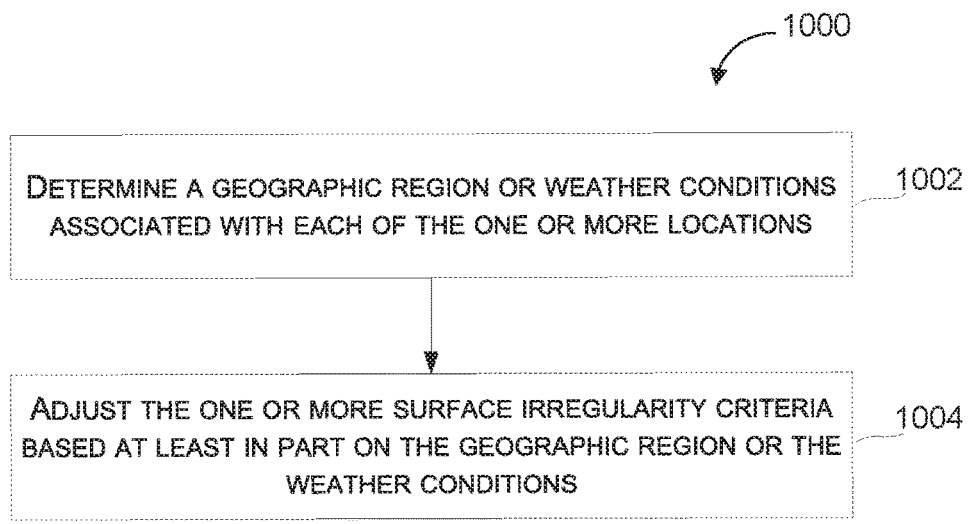
FIG. 10 depicts a flow diagram of surface mapping according to example embodiments of the present disclosure.

FIG. 10 depicts a flow diagram of an example method for generating surface maps according to example embodiments of the present disclosure. One or more portions of the method 1000 can be executed or implemented on one or more computing devices or computing systems including, for example, the computing device 102, the server computing system 130, and/or the training computing system 150. Further, one or more portions of the method 1000 can be executed or implemented as an algorithm on the hardware devices or systems disclosed herein. In some embodiments, one or more portions of the method 1000 can be performed as part of the method 500 that is depicted in FIG. 5. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining, based at least in part on the image data and the sensor data, a geographic region and/or weather conditions associated with each of the one or more locations. For example, the computing device 102 can access image data that includes semantic information indicating that a location is in a particular geographic region. By way of further example, the computing device 102 can access image data that is updated in real-time and which includes semantic information associated with real-time weather conditions at a location.

In some embodiments, the image data can include semantic information associated with symbols and/or language that is used in a geographic region. For example, the symbols on signage used to indicate a speed bump in one nation may be different from the symbols on signage used to indicate a speed bump in another nation.

At 1004, the method 1000 can include adjusting the one or more irregular surface criteria based at least in part on the geographic region and/or the weather conditions associated with each of the one or more locations. For example, the computing device 102 can adjust a depth threshold associated with one or more surface irregularities when the weather conditions include a large amount of rainfall that can make traversing a depression more challenging. By way of further example, the computing device 102 can adjust the one or more irregular surface criteria based at least in part on the language used in the sign imagery associated with the geographic region in which the computing device 102 is located. In this way the computing device 102 can adjust the one or more irregular surface criteria to account for different geographic regions that use different symbols and/or language to indicate the same type of irregular surface; and/or different geographic regions that use the same symbols and/or language to indicate different types of irregular surfaces.

Figure 11:
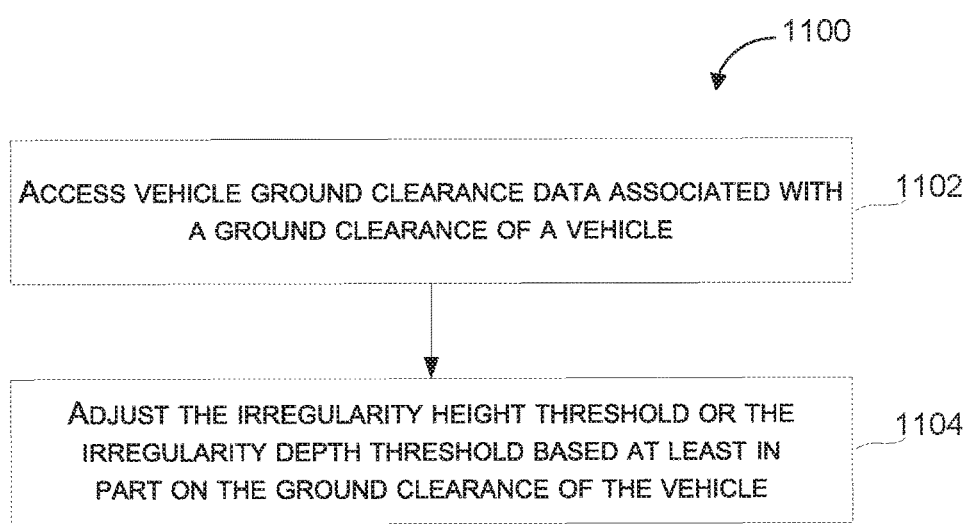
FIG. 11 depicts a flow diagram of surface mapping according to example embodiments of the present disclosure.

FIG. 11 depicts a flow diagram of an example method for generating surface maps according to example embodiments of the present disclosure. One or more portions of the method 1100 can be executed or implemented on one or more computing devices or computing systems including, for example, the computing device 102, the server computing system 130, and/or the training computing system 150. Further, one or more portions of the method 1100 can be executed or implemented as an algorithm on the hardware devices or systems disclosed herein. In some embodiments, one or more portions of the method 1100 can be performed as part of the method 500 that is depicted in FIG. 5. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include accessing vehicle ground clearance data associated with a ground clearance of a vehicle. For example, the computing device 102 can determine the ground clearance of the vehicle based at least in part on the minimum height of the undercarriage of a vehicle above a ground surface. By way of further example, the computing device 102 can determine the ground clearance of the vehicle by accessing vehicle data that includes information associated with the ground clearance of the vehicle.

At 1104, the method 1100 can include adjusting an irregularity height threshold and/or an irregularity depth threshold based at least in part on the ground clearance of the vehicle. In some embodiments, the one or more irregular surface criteria can include the irregularity height threshold and/or the irregularity depth threshold. For example, the irregularity height threshold can include a height above the average height of a surface in a predetermined area; and/or the irregularity depth threshold can include a depth below the average height of a surface in a predetermined area.

In some embodiments, the irregularity height threshold can be based at least in part on some proportion of the ground clearance of a vehicle. For example, for a vehicle with a ground clearance of twenty centimeters, the computing device 102 can adjust the irregularity height threshold to seventy percent of the ground clearance of the first vehicle, a height of fourteen centimeters. In some embodiments, the irregularity depth threshold can be based at least in part on some proportion of the ground clearance of a vehicle. For example, for a vehicle with a ground clearance of twenty centimeters, the computing device 102 can adjust the irregularity depth threshold to seventy percent of the ground clearance of the first vehicle, a depth of fourteen centimeters.

In some embodiments, the irregularity height threshold can be based at least in part on some distance below the ground clearance of a vehicle. For example, for a vehicle with a ground clearance of twenty centimeters, the computing device 102 can adjust the irregularity depth threshold to fifteen centimeters, thereby allowing a distance of five centimeters between the top of a protuberance of a ground surface and the bottom of the vehicle's undercarriage. In some embodiments, the irregularity depth threshold can be based at least in part on some distance below the ground clearance of a vehicle. For example, for a vehicle with a ground clearance of twenty centimeters, the computing device 102 can adjust the irregularity depth threshold to fifteen centimeters, thereby allowing a distance of five centimeters between the bottom of a depression in a ground surface and the bottom of the vehicle's undercarriage.

FIG. 12 depicts a flow diagram of an example method for generating surface maps according to example embodiments of the present disclosure. One or more portions of the method 1200 can be executed or implemented on one or more computing devices or computing systems including, for example, the computing device 102, the server computing system 130, and/or the training computing system 150. Further, one or more portions of the method 1200 can be executed or implemented as an algorithm on the hardware devices or systems disclosed herein. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include accessing image data and sensor data including image data that can include semantic information that is descriptive of a geographic region; and/or sensor data that can be indicative of one or more surface elements associated with one or more surfaces in the geographic region. The one or more surface elements can include one or more three-dimensional locations of the one or more surfaces in the geographic region. For example, the one or more surface elements can be associated with the one or more three-dimensional points in a LiDAR point cloud.

By way of further example, the computing device 102 can access image data that includes semantic information that is descriptive of one or more features of a geographic region; and sensor data including LiDAR data that is indicative of one or more surface elements associated with the one or more surfaces of a road in the geographic region.

At 1204, the method 1200 can include determining whether there is an association between the one or more surface elements and the semantic information that is descriptive of the geographic region. The semantic information that is descriptive of the geographic region can include one or more features that are descriptive of the geographic region. Determining whether there is an association between the one or more surface elements and the semantic information that is descriptive of the geographic region can include: one or more comparisons of the semantic information to the one or more surface elements; one or more comparisons of the semantic information to other semantic information and the one or more surface elements to one or more other surface elements; and/or one or more comparisons of the semantic information and the one or more surface elements to one or more other irregular surface criteria.

For example, the computing device 102 can evaluate the one or more surface elements and the semantic information to determine whether the one or more surface elements and the semantic information include information that is associated with one or more features of the geographic region. In particular, the computing device 102 can access the image data and the sensor data for a particular location at the geographic region and compare one or more spatial characteristics provided by the semantic information associated with one or more images of the location at the geographic region to one or more spatial characteristics of the one or more surface elements provided by the sensor data.

By way of further example, the computing device 102 can access the image data and the sensor data for a particular location at the geographic region and compare a geographic feature described as a speed bump provided by the semantic information associated with the location at the geographic region to one or more spatial characteristics of the one or more surface elements that correspond to a speed bump that are provided by the sensor data.

At 1206, the method 1200 can include generating map data for the geographic region associated with the one or more surface elements. In some embodiments, the map data can be based at least in part on whether there is an association between the one or more surface elements and the semantic information that is descriptive of the one or more geographic features.

In some examples, the one or more geographic features can be physically separate from the one or more surface elements. For example, semantic information may be associated with one or more geographic features including construction signs and barriers around a construction zone, and the one or more surface elements can be associated with the actual construction zone. The computing device 102 can then use semantic information of a first object (e.g., the construction signs) in combination with sensor data of a second object (e.g., the actual construction zone) to generate map data for a geographic region.

In some embodiments, one or more geographic features can be physically associated with one or more surface elements. For example, semantic information may be associated with one or more geographic features including a speed bump on a road surface; and one or more surface elements can also be associated with the same speed bump on the road surface. The computing device 102 can then use semantic information of a first object (e.g., the speed bump) in combination with sensor data of a second object (e.g., the same speed bump) to generate map data for a geographic region.

In some embodiments, the map data can include geographic information associated with one or more locations of the geographic region where the one or more surface elements are associated with the semantic information. For example, the computing system can determine that the one or more surface elements are associated with the semantic information based on the one or surface elements having a spatial arrangement consistent with an elevated portion of a ground surface including a speed bump and the semantic information including an indication that describes a speed bump at the same location as the one or more surface elements.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of mapping, the computer-implemented method comprising:

accessing, by a computing system comprising one or more processors, image data and sensor data, wherein the image data comprises a plurality of images of one or more locations and semantic information associated with the one or more locations, and wherein the sensor data comprises sensor information associated with three-dimensional features of one or more surfaces based on detection of the one or more surfaces at the one or more locations by one or more sensors;

determining, by the computing system, one or more irregular surfaces based at least in part on the image data and the sensor data, wherein the one or more irregular surfaces comprise the one or more surfaces associated with the image data and the sensor data that satisfy one or more irregular surface criteria at each of the one or more locations respectively, wherein satisfying the one or more irregular surface criteria comprises the three-dimensional features indicating that the one or more surfaces exceed a surface area threshold and include a depression that exceeds a depth threshold;

generating, by the computing system, map data comprising information associated with the one or more irregular surfaces; and controlling, by the computing system, one or more vehicle systems of a vehicle based at least in part on the map data, wherein the one or more vehicle systems comprise one or more motor systems.

2. The computer-implemented method of claim 1, wherein the depth threshold is based at least in part on a depth below an average height of ground surface of the one or more surfaces.

3. The computer-implemented method of claim 1, wherein the determining, by the computing system, the one or more irregular surfaces based at least in part on the image data and the sensor data, wherein the one or more irregular surfaces comprise the one or more surfaces associated with the image data and the sensor data that satisfy the one or more irregular surface criteria at each of the one or more locations respectively comprises:

determining, by the computing system, one or more portions of the one or more surfaces having a shape that satisfies one or more irregular shape criteria associated with irregularity in a length of sides of the one or more surfaces or irregularity in angles of the one or more surfaces.

4. The computer-implemented method of claim 1, wherein the determining, by the computing system, the one or more irregular surfaces based at least in part on the image data and the sensor data, wherein the one or more irregular surfaces comprise the one or more surfaces associated with the image data and the sensor data that satisfy the one or more irregular surface criteria at each of the one or more locations respectively comprises:

determining, by the computing system, one or more vehicle characteristics of a vehicle;

determining, by the computing system, one or more surface characteristics associated with each of the one or more surfaces, wherein the one or more surface characteristics comprise one or more gradients associated with the one or more surfaces or a surface height associated with the one or more surfaces; and determining, by the computing system, that the one or more irregular surface criteria are satisfied when the one or more surface characteristics associated with each of the one or more surfaces satisfy one or more surface characteristic criteria based at least in part on the one or more vehicle characteristics of the vehicle.

5. The computer-implemented method of claim 4, wherein the one or more vehicle characteristics comprise a ground clearance of the vehicle, a height of a vehicle, a width of a vehicle, a distance between a front wheel of the vehicle and a front bumper of the vehicle, or a firmness of a vehicle suspension system.

6. The computer-implemented method of claim 1, further comprising:

determining, by the computing system, based at least in part on the image data and the sensor data, one or more irregular surface types associated with each of the one or more irregular surfaces; and determining, by the computing system, that the one or more irregular surfaces are intentionally irregular surfaces if the one or more irregular surface types associated with the image data for an irregular surface of the one or more irregular surfaces match the one or more irregular surface types associated with the sensor data for the irregular surface.

7. The computer-implemented method of claim 6, further comprising:

determining, by the computing system, that the one or more irregular surfaces that are not intentionally irregular surfaces are one or more unintentionally irregular surfaces; and generating, by the computing system, data associated with implementing a first notification in response to the one or more intentionally irregular surfaces and data associated with implementing a second notification in response to the one or more unintentionally irregular surfaces.

8. The computer-implemented method of claim 1, wherein the one or more sensors include one or more light detection and ranging (LiDAR) devices configured to generate the sensor data based at least in part on a LiDAR scan of the one or more surfaces of the one or more locations.

9. The computer-implemented method of claim 1, wherein the one or more vehicle systems further comprise one or more steering systems, one or more notification systems, one or more braking systems, or one or more lighting systems.

10. The computer-implemented method of claim 1, further comprising:

determining, by the computing system, based at least in part on the image data, a geographic region or weather conditions associated with each of the one or more locations; and adjusting, by the computing system, the one or more irregular surface criteria based at least in part on the geographic region or the weather conditions associated with each of the one or more locations.

11. The computer-implemented method of claim 1, further comprising:

generating data associated with implementing one or more indications based at least in part on a vehicle being within a predetermined distance of the one or more irregular surfaces, wherein the one or more indications comprise one or more visual indications, one or more maps comprising the one or more locations of the one or more irregular surfaces, one or more textual descriptions of the one or more irregular surfaces, or one or more auditory indications associated with the one or more irregular surfaces.

12. The computer-implemented method of claim 1, wherein the one or more irregular surface criteria comprise an irregularity height threshold or an irregularity depth threshold, and further comprising:

accessing vehicle height data associated with a ground clearance of a vehicle; and adjusting the irregularity height threshold or the irregularity depth threshold based at least in part on the ground clearance of the vehicle.

13. The computer-implemented method of claim 1, further comprising:

using the map data comprising information associated with the one or more irregular surfaces to determine a navigational route for a vehicle.

14. One or more tangible non-transitory computer-readable media storing computer-readable instructions that when executed by one or more processors cause the one or more processors to perform operations, the operations comprising:

accessing image data and sensor data, wherein the image data comprises semantic information that is descriptive of one or more geographic features of a geographic region, and wherein the sensor data comprises sensor information associated with three-dimensional features of one or more surface elements associated with one or more surfaces in the geographic region;

determining one or more irregular surfaces based at least in part on whether the one or more surface elements and the semantic information that is descriptive of the one or more geographic features of the geographic region satisfy one or more irregular surface criteria, wherein satisfying the one or more irregular surface criteria comprises the three-dimensional features indicating that the one or more surface elements exceed a surface area threshold and include a depression that exceeds a depth threshold;

generating map data for the geographic region associated with the one or more surface elements based on whether there is the association between the one or more surface elements and the semantic information that is descriptive of the one or more geographic features; and controlling one or more vehicle systems of a vehicle based at least in part on the map data, wherein the one or more vehicle systems comprise one or more motor systems.

15. The one or more tangible non-transitory computer-readable media of claim 14, wherein the map data comprises geographic information associated with one or more locations of the geographic region where the one or more surface elements are associated with the semantic information.

16. The one or more tangible non-transitory computer-readable media of claim 14, wherein the semantic information comprises data descriptive of one or more geographic features in the geographic region, and wherein the one or more surface elements are physically separate from the one or more geographic features.

17. A computing system comprising:

one or more processors;

one or more non-transitory computer-readable media storing instructions that when executed by the one or more processors cause the one or more processors to perform operations comprising:

accessing image data and sensor data, wherein the image data comprises semantic information that is descriptive of one or more geographic features of a geographic region, and wherein, the sensor data comprises sensor information associated with three-dimensional features of one or more surface elements associated with one or more surfaces in the geographic region;

determining one or more irregular surfaces based at least in part on whether the one or more surface elements and the semantic information that is descriptive of the one or more geographic features of the geographic region satisfy one or more irregular surface criteria, wherein the satisfying the one or more irregular surface criteria comprises the three-dimensional features indicating that the one or more surface elements exceed a surface area threshold and include a depression that exceeds a depth threshold;

generating map data for the geographic region associated with the one or more surface elements based on whether there is the association between the one or more surface elements and the semantic information that is descriptive of the one or more geographic features; and controlling one or more vehicle systems of a vehicle based at least in part on the map data, wherein the one or more vehicle systems comprise one or more motor systems.

18. The computing system of claim 17, further comprising:

determining, based at least in part on the image data and the sensor data, one or more surface types associated with each of the one or more surface elements; and generating the map data comprising semantic information associated with the one or more surface types of the one or more surface elements at one or more locations of the geographic region.

19. The computing system of claim 18, wherein the one or more surface types comprise one or more ground surfaces or one or more non-ground surfaces, and wherein the one or more ground surfaces comprise one or more paved ground surfaces, one or more unpaved ground surfaces, one or more sidewalk surfaces, or one or more gravel surfaces.

20. The computing system of claim 17, wherein satisfying the one or more irregular surface criteria comprises the three-dimensional features indicating that the one or more surfaces exceed a surface area threshold and include a protuberance that exceeds a height threshold.

* * * * *